United States Patent
Kusaka

(10) Patent No.: US 7,488,923 B2
(45) Date of Patent: Feb. 10, 2009

(54) FOCUS DETECTION DEVICE, OPTICAL SYSTEM AND FOCUS DETECTION METHOD

(75) Inventor: Yosuke Kusaka, Yokohama (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 11/591,516

(22) Filed: Nov. 2, 2006

(65) Prior Publication Data

US 2007/0102619 A1  May 10, 2007

(30) Foreign Application Priority Data

Nov. 9, 2005  (JP) .............................. 2005-325073

(51) Int. Cl.
*G02B 7/04* (2006.01)
*G03B 13/00* (2006.01)

(52) U.S. Cl. ..................... 250/201.2; 348/345; 348/349

(58) Field of Classification Search ... 250/201.1–201.9, 250/204, 208.1; 348/349, 294; 396/104, 396/124; 369/44.26
See application file for complete search history.

(56) References Cited

U.S. PATENT DOCUMENTS

| | | | | |
|---|---|---|---|---|
| 4,346,970 A | * | 8/1982 | Kawabata et al. | 396/92 |
| 4,410,804 A | * | 10/1983 | Stauffer | 250/208.2 |
| 4,687,917 A | * | 8/1987 | Kusaka et al. | 250/201.8 |
| 5,367,153 A | * | 11/1994 | Suda et al. | 250/201.8 |
| 6,750,437 B2 | * | 6/2004 | Yamashita et al. | 250/208.1 |
| 6,933,978 B1 | | 8/2005 | Suda | |
| 7,041,950 B2 | | 5/2006 | Nagano | |
| 2002/0125409 A1 | | 9/2002 | Nagano | |
| 2004/0179128 A1 | * | 9/2004 | Oikawa | 348/345 |

FOREIGN PATENT DOCUMENTS

| | | |
|---|---|---|
| JP | A 58-24105 | 2/1983 |
| JP | A 3-033708 | 2/1991 |
| JP | A 5-127074 | 5/1993 |
| JP | B2 5-61610 | 9/1993 |
| JP | A 2001-124984 | 5/2001 |
| JP | A 2002-250860 | 9/2002 |
| JP | A 2003-241075 | 8/2003 |

* cited by examiner

*Primary Examiner*—Georgia Y Epps
*Assistant Examiner*—Jennifer Bennett
(74) *Attorney, Agent, or Firm*—Oliff & Berridge, PLC

(57) ABSTRACT

A focus detection device comprises a micro lens array disposed near an estimated focal plane of an image forming optical system and formed by arraying a plurality of micro lenses, a light receiving device provided in correspondence to each of the plurality of micro lenses, which includes three or more light receiving portions disposed along a direction in which the plurality of micro lenses are arrayed, and a focus detection circuit that detects a focal adjustment state with the image forming optical system based upon a signal output from the light receiving device.

20 Claims, 25 Drawing Sheets

FOCUS DETECTION DEVICE, OPTICAL SYSTEM AND FOCUS DETECTION METHOD

INCORPORATION BY REFERENCE

The disclosure of the following priority application is herein incorporated by reference: Japanese Patent Application No. 2005-325073 filed Nov. 9, 2005

BACKGROUND OF THE INVENTION

1. Field of the Invention

The present invention relates to a focus detection device, an optical system that includes the focus detection device and a focus detection method.

2. Description of Related Art

Japanese Laid Open Patent Publication No. 2003-241075 discloses a focus detection device that detects the state of focal adjustment achieved with an optical system with focus detection light fluxes having passed through a pair of areas at the exit pupil plane of the optical system by utilizing a micro lens array. If a discrepancy manifests between the output levels of the pair of images formed with the pair of focus detection light fluxes, the device corrects the output levels of the pair of images so as to equalize them and then detects the extent of image offset based upon the pair of corrected image outputs.

However, in the related art, since image information after photoelectric conversion is expanded or reduced, highly accurate detection of image offset can not be achieved if the output levels of the pair of images become greatly unbalanced owing to quantization or noise.

SUMARY OF THE INVENTION

A focus detection device according to the present invention comprises a micro lens array disposed near an estimated focal plane of an image forming optical system and formed by arraying a plurality of micro lenses, a light receiving device provided in correspondence to each of the plurality of micro lenses, which includes three or more light receiving portions disposed along a direction in which the plurality of micro lenses are arrayed, and a focus detection circuit that detects a focal adjustment state with the image forming optical system based upon a signal output from the light receiving device.

The focus detection circuit may select a pair of light receiving portions from the three or more light receiving portions, set a pair of light receiving zones based upon the pair of light receiving portions and detect the focal adjustment state based upon output signals from the pair of light receiving zones.

The three or more light receiving portions may assume shapes identical to one another.

The focus detection circuit may set the pair of light receiving zones based upon aperture information for the image forming optical system. In this case, the focus detection circuit may calculate an image offset quantity, indicating an extent of offset manifesting in a pair of images formed with a pair of light fluxes passing through different pupil areas at the image forming optical system based upon the output signals from the pair of light receiving zones and detect the focal adjustment state of the image forming optical system based upon the image offset quantity having been calculated.

The focus detection circuit may select the pair of light receiving portions from the three or more light receiving portions so as to substantially equalize quantities of light received at the pair of light receiving portions.

The focus detection circuit may determine a conversion coefficient to be used to convert the image offset quantity to a defocus quantity indicating an extent of defocusing at the image forming optical system in correspondence to the pair of light receiving zones. In this case, the focus detection circuit can determine the conversion coefficient in correspondence to an opening angle formed by gravitational centers of the pair of light fluxes received at the pair of light receiving zones.

An optical system according to the present invention comprises an image forming optical system, a micro lens array disposed near an estimated focal plane of the image forming optical system and formed by arraying a plurality of micro lenses, a light receiving device provided in correspondence to each of the plurality of micro lenses, which includes three or more light receiving portions disposed along a direction in which the plurality of micro lenses are arrayed, and a focus detection circuit that detects a focal adjustment state with the image forming optical system based upon a signal output from the light receiving device.

The focus detection circuit may select a pair of light receiving portions from the three or more light receiving portions, set a pair of light receiving zones based upon the pair of light receiving portions and detect the focal adjustment state based upon output signals from the pair of light receiving zones.

The optical system may further comprise an image-capturing element that includes two-dimensionally arrayed pixels each constituted with a second micro lens and a second light receiving portion and captures an image formed via the image forming optical system. In this case, the micro lens array and the light receiving device maybe constituted with some of the pixels at image-capturing element.

The optical system may further comprise a storage device at which aperture information for the image forming optical system is stored. In this case, the focus detection circuit may set the pair of light receiving zones in correspondence to the aperture information.

The focus detection circuit may calculate an image offset quantity indicating an extent of offset manifesting in a pair of images formed with a pair of light fluxes passing through different pupil areas at the image forming optical system, based upon the output signals from the pair of light receiving zones and detect the focal adjustment state of the image forming optical system based upon the image offset quantity having been calculated.

The focus detection circuit may select the pair of light receiving portions from the three or more light receiving portions so as to substantially equalize quantities of light received at the pair of light receiving portions.

The focus detection circuit may determine a conversion coefficient to be used to convert the image offset quantity to a defocus quantity indicating an extent of defocusing at the image forming optical system in correspondence to the pair of light receiving zones.

The focus detection circuit may determine the conversion coefficient in correspondence to an opening angle formed by gravitational centers of the pair of light fluxes received at the pair of light receiving zones.

The optical system may further comprise an image-capturing element that includes pixels each constituted with one of the plurality of micro lenses and the light receiving device and captures a subject image formed via the image forming optical system.

A focus detection method according to the present invention comprises forming a pixel row by arraying a plurality of pixels each constituted with a portion of a light receiving device, the portion of the light receiving device being constituted with, three or more light receiving portions disposed in correspondence to a micro lens and disposing the pixel row near an estimated image forming plane of an optical system, selecting a pair of light receiving portions from the three or more light receiving portions based upon aperture information for the optical system, setting a pair of light receiving zones based upon the pair of light receiving portions, calculating an image offset quantity indicating an extent of offset manifesting in a pair of images formed with a pair of light fluxes passing through different pupil areas at the optical system based upon output signals from the light receiving zones, and detecting a focal adjustment state at the optical system based upon the image offset quantity having been calculated.

The pair of light receiving portions may be selected from the three or more light receiving portions so as to substantially equalize quantities of light received at the pair of light receiving portions.

The image offset quantity maybe converted to a defocus quantity indicating an extent of defocusing at the optical system by using a conversion coefficient when detecting the focal adjustment state at the optical system. In this case, the conversion coefficient may be determined in correspondence to the light receiving zones.

DETAILED DESCRIPTION OF THE PREFERRED EMBODIMENTS

Figure 1:
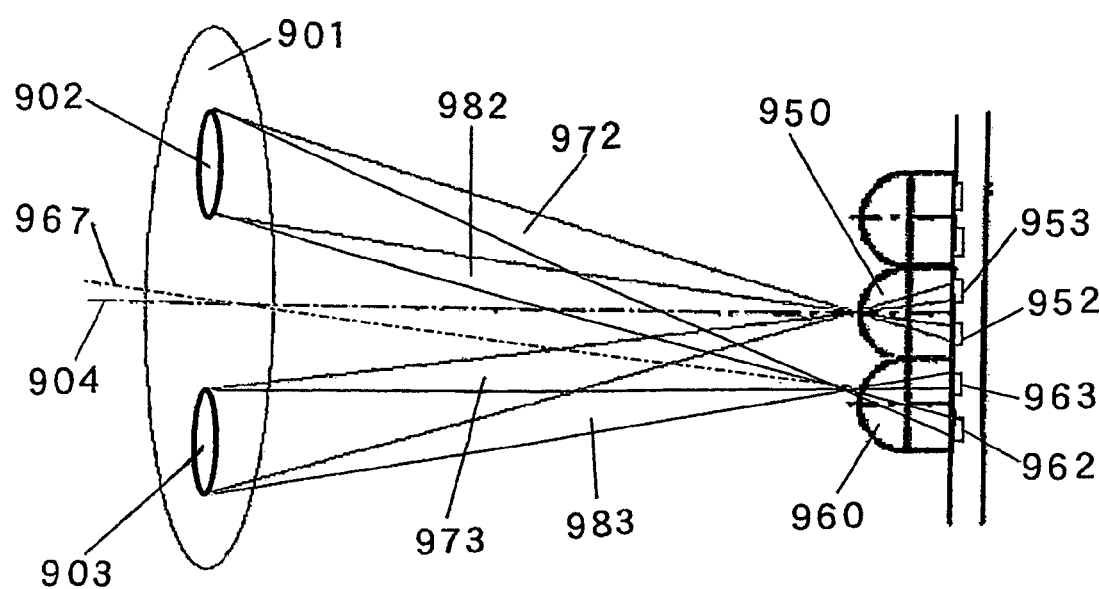
FIG. 1 shows the structure adopted in the focus detection device achieved in an embodiment of the present invention.

FIG. 1 shows the structure adopted in the focus detection device achieved in an embodiment of the present invention. It is to be noted that FIG. 1 is a partial enlargement that includes the micro lens disposed on the optical axis of the image forming optical system (not shown) in an optical system such as a camera equipped with the focus detection device in the embodiment and a micro lens adjacent to the micro lens on the optical axis. In fact, a single focus detection area is formed by arraying numerous micro lenses. In addition, micro lens arrays are disposed off the optical axis of the image forming optical system as well to form other focus detection areas. The state of the focal adjustment in the image forming optical system is detected at each position where a focus detection area is set.

In FIG. 1, reference numeral 901 indicates the exit pupil of the image forming optical system, reference numerals 902 and 903 indicate range finding pupils, reference numeral 904 indicates the optical axis of the image forming optical system, reference numerals 950 and 960 each indicate a micro lens, a pair of reference numerals 952 and 953 and a pair of reference numerals 962 and 963 each indicate a pair of light receiving portions at the image sensor used for the focus detection, reference numeral 967 indicates the projection axis of the range finding pupils and reference numerals 972, 973, 982 and 983 each indicate a focus detection light flux.

The micro lenses 950 and 960 are disposed near the estimated image forming plane at the image forming optical system. The shapes of the pair of light receiving portions 952 and 953 set to the rear of the micro lens 950 disposed on the optical axis 904 are projected via the micro lens 950 to the range finding pupils 902 and 903 on the exit pupil 901 at the optical system along the optical axis 904. In addition, the micro lens 960 set off the optical axis 904 projects the shapes of the pair of light receiving portions 962 and 963 disposed to the rear of the micro lens 960 to the range finding pupils 902 and 903 on the exit pupil 901 along the projection axis 967.

The light receiving portion 952 outputs information reflecting the intensity of the image formed on the micro lens 950 by the focus detection light flux 972 having passed through the range-finding pupil 902, whereas the light receiving portion 953 outputs information reflecting the intensity of the image formed on the micro lens 950 by the focus detection light flux 973 having passed through the range finding pupil 903. In addition, the light receiving portion 962 outputs information reflecting the intensity of the image formed on the micro lens 960 by the focus detection light flux 982 having passed through the range finding pupil 902, whereas the light receiving portion 963 outputs information reflecting the intensity of the image formed on the micro lens 960 by the focus detection light flux 983 having passed through the range finding pupil 903.

By disposing numerous micro lenses each adopting the structure described above in an array and integrating the outputs from the pair of light receiving portions disposed to the rear of each micro lens, information related to the intensity distribution of the pair of images formed on the micro lens array by the corresponding pair of focus detection light fluxes, one passing through the range finding pupil 902 and the other passing through the range finding pupil 903, is obtained. Then, image offset calculation processing of the known art (e.g., correlational processing or phase difference detection processing) is executed on the information thus obtained so as to detect the extent of the image offset manifesting between the pair of images. The extent to which the current image forming plane is offset relative to the estimated image forming plane, i.e., the extent of the deviation of the image forming plane (defocus quantity) at the focus detection position corresponding to the position of a given micro lens array on the estimated image forming plane, can be calculated by multiplying the image offset quantity indicating the extent of the image offset by a predetermined conversion coefficient.

By adopting a pupil division method in conjunction with micro lens arrays, the defocus quantity, i.e., the direction and the extent of the offset of the current image forming plane along the optical axis relative to the estimated image forming plane, can be accurately calculated as the results of the focus detection. Thus, a focus match can be achieved for the image forming optical system more speedily compared to other focus detection methods such as the contrast detection method, by displacing the image forming optical system in correspondence to the defocus quantity.

It is crucial that the pair of images achieve a high level of similarity in the pupil division-type focus detection device utilizing micro lens arrays, in order to detect the image offset quantity accurately. Accordingly, the balance between the levels with which the pair of images are output is explained next.

Figure 2A:
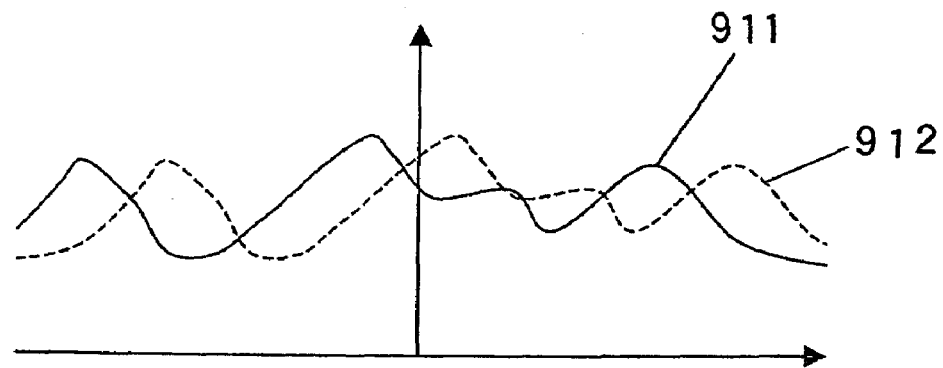
FIGS. 2A-2C each show the pair of images received at a pair of light receiving portions disposed to the rear of a micro lens.
Figure 2B:
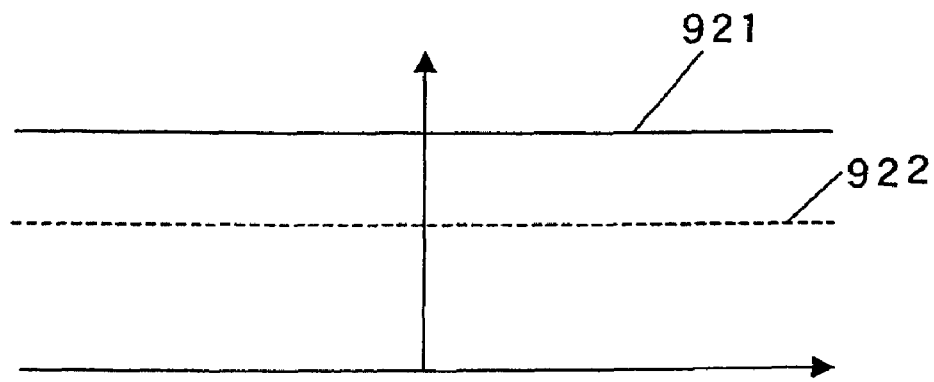
Figure 2C:
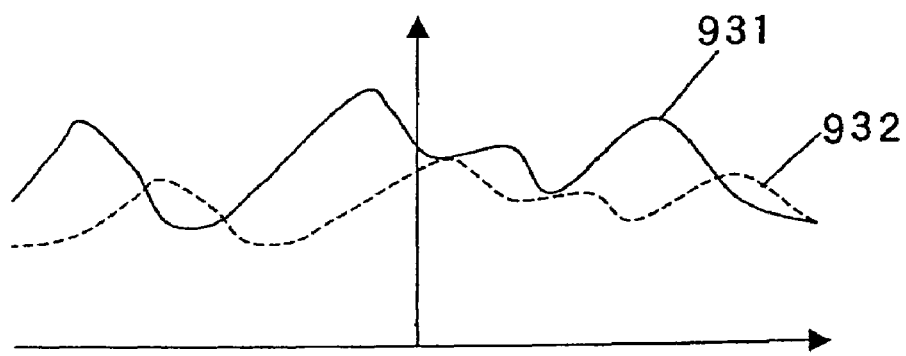

FIGS. 2A-2C each show a pair of images received at a pair of light receiving portions disposed to the rear of a micro lens. A pair of images 911 and 912 in FIG. 2A achieve a high level of similarity except that they are offset along the lateral direction and accordingly, the image offset quantity can be calculated accurately through a known correlational arithmetic operation. A pair of images 921 and 922 in FIG. 2B are subject images with uniform brightness, which are detected with a focus detection image sensor when an eclipse of the focus detection light fluxes occurs due to a vignetting or the like and the pair of focus detection light fluxes become unbalanced. As shown in FIG. 2B, the output level of one of the images, i.e., the image 921, and the output level of the other image 922, which should match each other, have become different due to the eclipse.

When the same subject as that in FIG. 2A is captured in the conditions shown in FIG. 2B, the outputs of a pair of images 931 and 932 become greatly unbalanced, as shown in FIG. 2C. As a result, a significant error occurs in the image offset quantity calculated by executing the known correlational arithmetic operation on the pair of images 931 and 932, which leads to poor accuracy in the focus detection. In the worst-case scenario, the image offset quantity cannot be calculated and thus, the focus detection is disabled.

Figure 3:
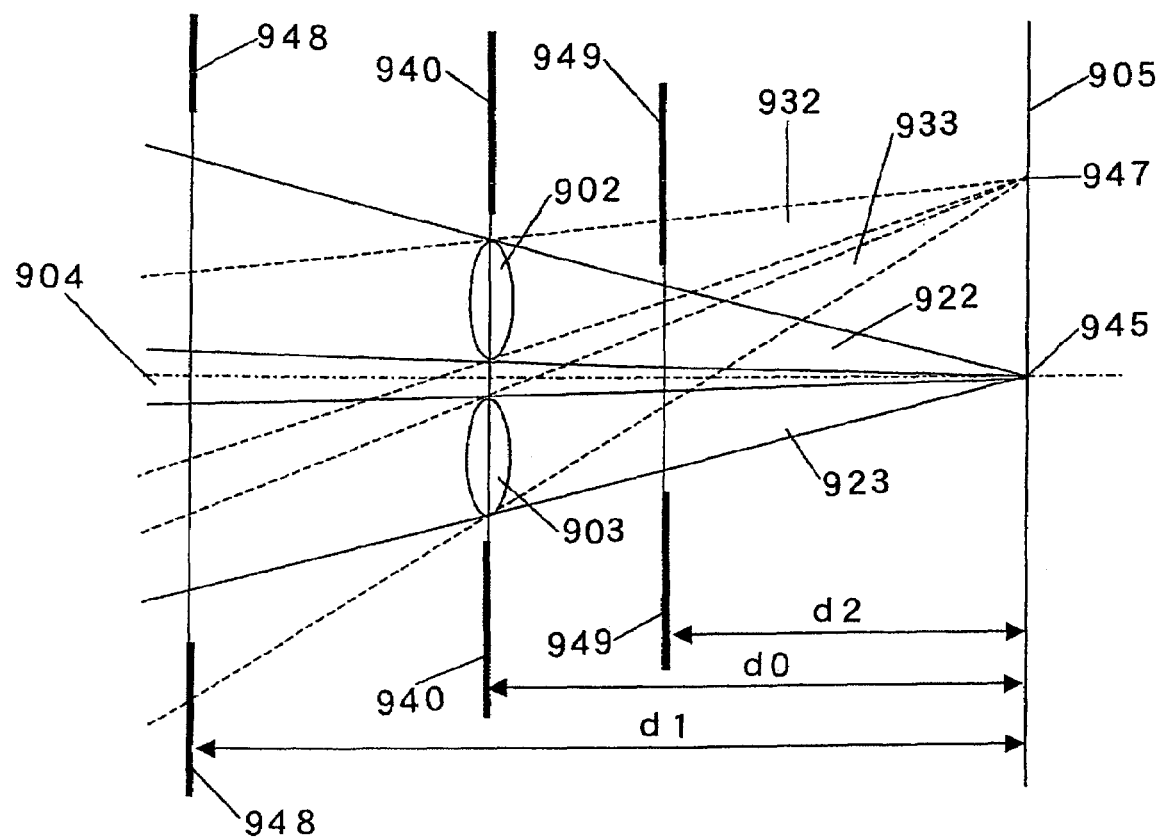
FIG. 3 illustrates an eclipse (vignetting) of the focus detection light fluxes.

In reference to FIG. 3, an eclipse (vignetting) of focus detection light fluxes is explained. In FIG. 3, reference numeral 905 indicates a focus detection plane, reference numeral 940 indicates an exit pupil of the aperture or an opening other than the aperture at the image forming optical system matching the exit pupil plane 901 in FIG. 1 (present over a distance d0 from the focus detection plane 905) and reference 948 indicates an exit pupil of the aperture or an opening other than the aperture at the image forming optical system present further away (present over a distance d1 from the focus detection plane 905) than the exit pupil plane 901. In addition, reference numeral 949 indicates an exit pupil of the aperture or an opening other than the aperture at the image forming optical system closer (present over a distance d2 from the focus detection plane 905) than the exit pupil plane 901, reference numeral 945 indicates the position of the focus detection area set on the optical axis 904 and reference numeral 947 indicates the position of a focus detection area set away from the optical axis and in the periphery of the image plane. Reference numerals 922 and 923 indicate a pair of focus detection light fluxes that enter the micro lens array disposed at the position 945 assumed by the focus detection area on the optical axis 904, whereas reference numerals 932 and 933 indicate a pair of focus detection light fluxes that enter the micro lens array disposed at the position 947 assumed by the focus detection area present over a distance from the optical axis 904 and in the periphery of the image plane.

Normally, the aperture or an opening other than the aperture (such as a lens end) at the image forming optical system ranges over a circular area around the optical axis 904 and the exit pupils 940, 948 and 949, too, each assume a circular shape. The micro lens array disposed at the focus detection area 945 on the optical axis 904 and the micro lens array disposed at the position 947 assumed by the focus detection area present in the periphery of the image plane off the optical axis 904 each detect a pair of images by using the pair of focus detection light fluxes (922, 923) or (932, 933) passing through the pair of substantially identical range finding pupils 902 and 903 on the exit pupil plane 901 further frontward relative to the focus detection plane 905 by the predetermined distance d0.

As long as the exit pupil 940 of the aperture or an opening other than the aperture at the image forming optical system is substantially aligned with the exit pupil plane 901 and its opening diameter or opening area is greater than the areas of the range finding pupils 902 and 903, no eclipse (vignetting) occurs in the pair of focus detection light fluxes (922, 923) or (932, 933) and the output levels of each pair of images match.

If the exit pupil 940 of the aperture or an opening other than the aperture at the image forming optical system is substantially aligned with the exit pupil plane 901 and its opening diameter or opening area is smaller than the areas of the range finding pupils 902 and 903, an eclipse (vignetting) occurs in the pairs of focus detection light fluxes (922, 923) and (932, 933). However, since each pair of focus detection light fluxes are eclipsed with substantial uniformity, the corresponding pair of images is output with matching levels.

Even if the exit pupil 948 or 949 of the aperture or an opening other than the aperture at the image forming optical system is not aligned with the exit pupil plane 901 and is further away or closer than the exit pupil plane 901, the output levels of the pair of images corresponding to the pair of focus detection light fluxes 922 and 923 entering the focus detection area 945 on the optical axis 904 match each other as long as the opening diameter or the opening area of the exit pupil is set so as not to eclipse the pair of focus detection light fluxes (922, 923). Even if the pair of focus detection light fluxes (922, 923) are eclipsed due to the specific opening diameter or opening area assumed at the exit pupil 948 or 949, the eclipse occurs with substantial uniformity and thus the output levels of the pair of images match.

Even if the exit pupil 948 or 949 of the aperture or an opening other than the aperture at the image forming optical system is not aligned with the exit pupil plane 901 and is further away or closer than the exit pupil plane 901, the output levels of the pair of images corresponding to the pair of focus detection light fluxes 932 and 933 entering the focus detection area 947 off the optical axis 904 match each other as long as the opening diameter or the opening area of the exit pupil is set so as not to eclipse the pair of focus detection light fluxes (932, 933). However, if the pair of focus detection light fluxes (932, 933) are eclipsed due to the specific opening diameter or opening area assumed at the exit pupil 948 or 949, the zones through which the focus detection light fluxes (932, 933) pass-through the plane distanced from the exit pupil plane 901 become asymmetrical to each other relative to the optical axis. As a result, as either one of the focus detection light fluxes becomes eclipsed or both focus detection light fluxes become eclipsed to greatly varying extents, a significant difference between the output levels of the pair of images occurs.

Figure 4:
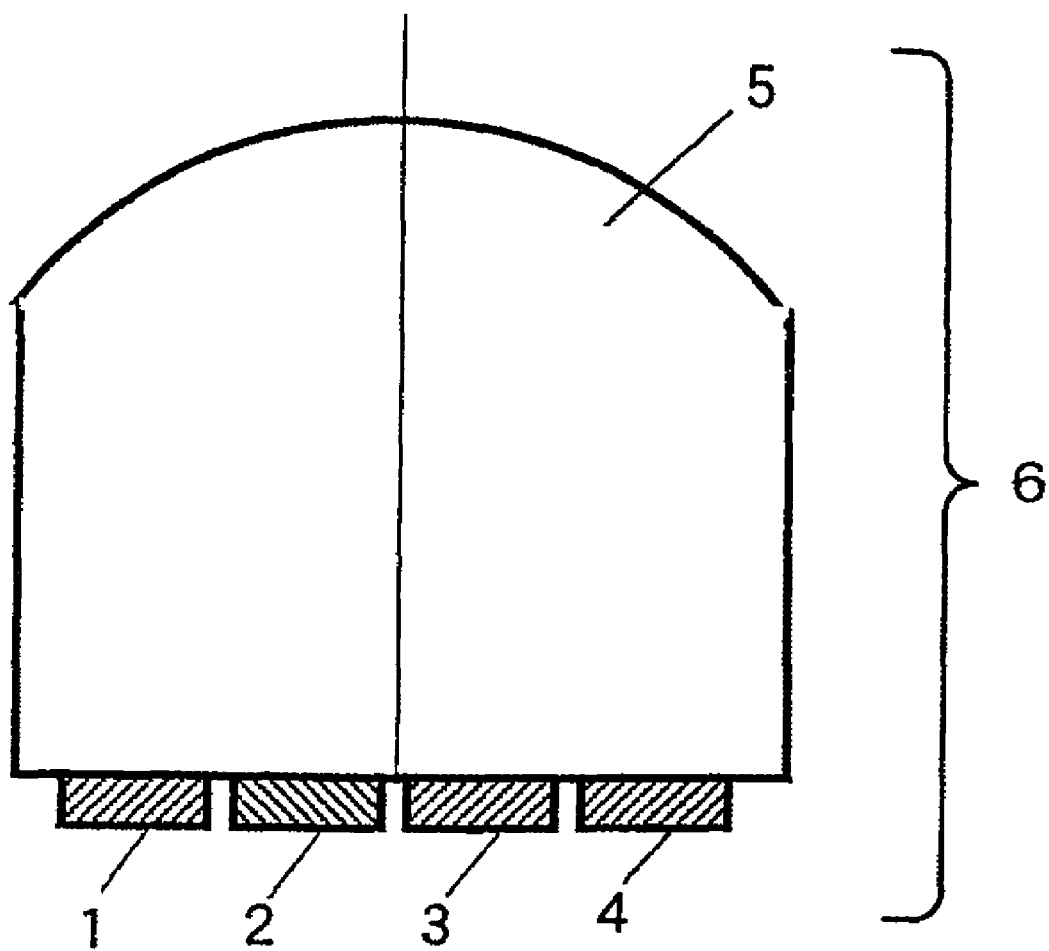
FIG. 4 is a sectional view of one of the micro lens units in the pupil division-type focus adjustment device adopting a micro lens array structure, as achieved in an embodiment of the present invention.

FIG. 4 is a sectional view of one of the micro lens units at the pupil division-type focus detection device in the embodiment adopting the micro lens array structure. A micro lens unit 6 (a single focus detection pixel) is formed by disposing image sensor light receiving portions 1, 2, 3 and 4 side-by-side to the rear of a micro lens 5 (optical element) A micro lens unit array is formed by disposing a plurality of micro lens units 6 along the direction in which the light receiving portions 1, 2, 3 and 4 are set side-by-side, and by detecting the image offset quantity of a pair of image signals based upon the output from the array (constituted with a plurality of focus detection pixels), the state of the focal adjustment achieved at the image forming optical system is detected. With the lens function of the micro lens 5, focus detection light fluxes entering the micro lens 5 along a plurality of different directions are received at the light receiving portions 1, 2, 3 and 4. It is to be noted that the light receiving portions 1-4 adopt shapes substantially identical to one another. The only restriction with regard to the quantity of the light receiving portions is that there be at least three light receiving portions, and thus, the quantity of light receiving portions does not need to be four.

Figure 5:
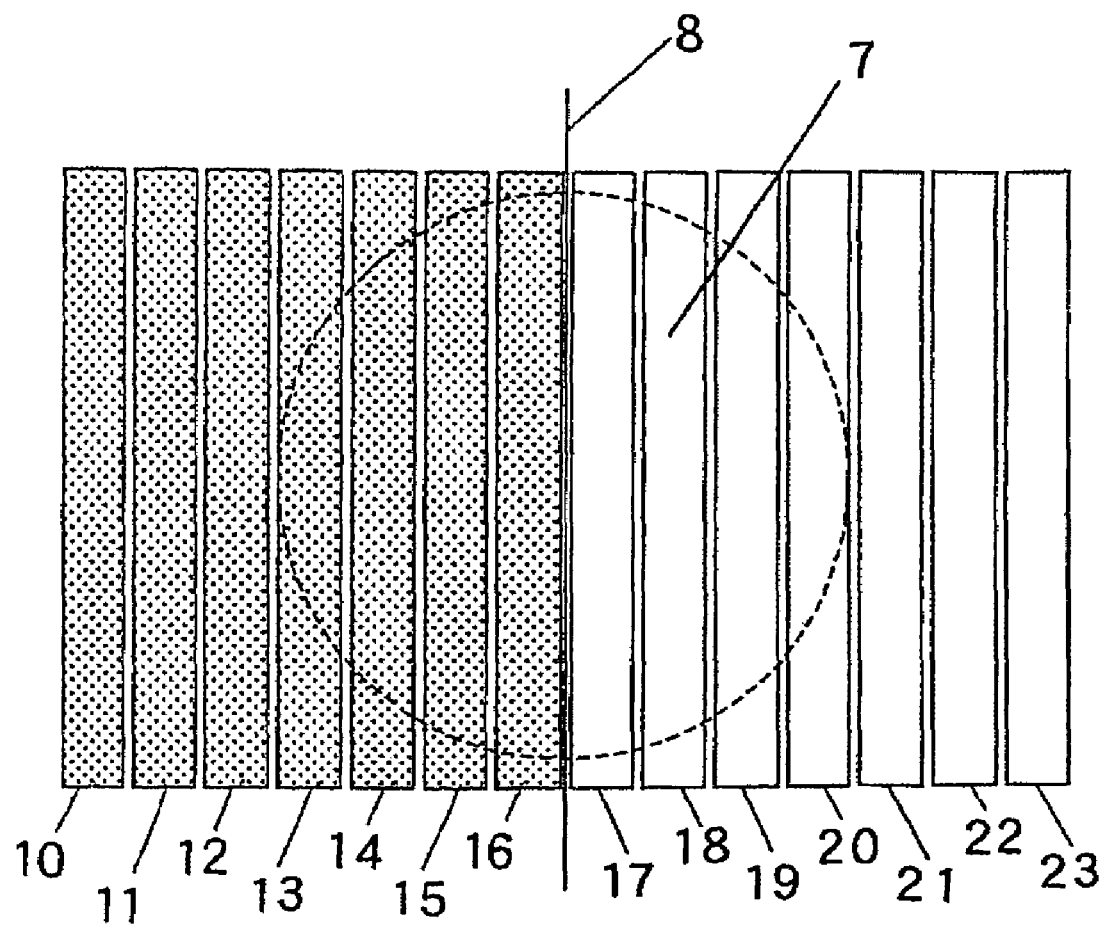
FIG. 5 is a front view of the light receiving portions at the micro lens unit.

FIG. 5 is a front view of the light receiving portions at the micro lens unit 6. While FIG. 4 shows four light receiving portions, FIG. 5 shows a micro lens unit with fourteen light receiving portions. Light receiving portions 10-23 assuming shapes substantially identical to one another are disposed side-by-side and light fluxes originating from a given image forming optical system is projected onto an area 7 (inside the circle indicated by the dotted line) over the light receiving portions 10-23 via the micro lens 5.

FIG. 5 shows the area 7 ranging from the light receiving portion 13 through the light receiving portion 20 and a central line 8 dividing the area 7 into two portions containing equal numbers of light receiving portions extends between the light receiving portion 16 and the light receiving portion 17. The plurality of light receiving portions 10-23 are divided into groups (10-16) and (17-23) each contained in one of a pair of zones (light receiving zones) set on the left side and on the right side of the central line 8. One of the image signals in the pair of image signals is formed by using the outputs from the light receiving portions in one zone (containing the light receiving portions 10-16), and the other image signals in the pair of image signals is formed by using the outputs from the light receiving portions in the other zone (containing the light receiving portions 17-23). Thus, a pair of images formed with the pair of focus detection light fluxes with light quantities substantially equal to each other can be output.

The position and the shape of the area 7 over which light is projected on the light receiving portions 10-23 are affected by the type of optical system in use, and they are also altered even when a given type of image forming optical system is used, depending upon the focusing state, the zooming state, the aperture setting conditions and the like. The position and the shape of the area 7 can be calculated based upon aperture information and the focus detection position (the position within a plane perpendicular to the optical axis, on which the micro lens array is disposed). It is to be noted that the aperture information includes information indicating the structure of the image forming optical system and information indicating the positions/shapes of the aperture and a lens end that regulate the light flux entry along the optical axis relative to the estimated image forming plane. By dividing the plurality of light receiving portions into two groups, one present on one side of the boundary line 8 extending perpendicular to the direction along which the light receiving portions are disposed side-by-side so as to divide the area 7 thus calculated into to substantially equal portions and the other present on the other side of the boundary line 8, a pair of images formed with the pair of focus detection light fluxes with light quantities substantially equal to each other can be output.

Figure 6:
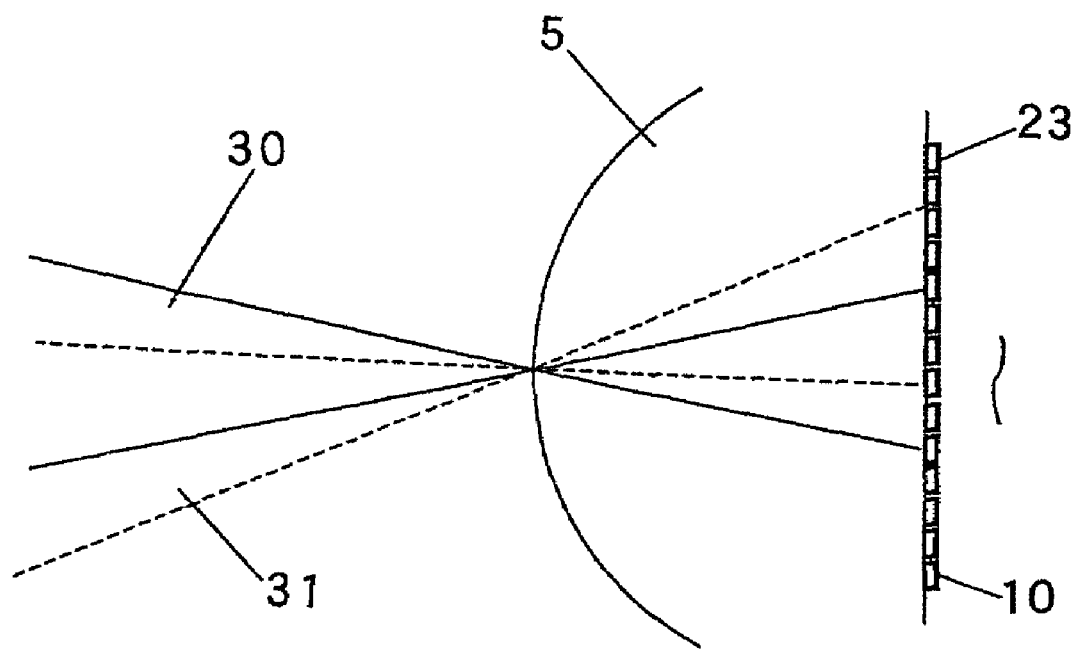
FIG. 6 is a sectional view of the micro lens unit.

FIG. 6 is a sectional view of the micro lens unit 6. Depending upon the specific structure adopted in the image forming optical system, the focusing state, the zooming state and the aperture setting conditions, the directions of light fluxes traveling from the image forming optical system to the micro lens unit 6 are altered. A light flux 30 indicated by the solid line and a light flux 31 indicated by a dotted line in FIG. 6 enter the micro lens unit from different directions and accordingly, the light fluxes are projected via the micro lens 5 over different zones over the light receiving portions 10-23.

Figure 7:
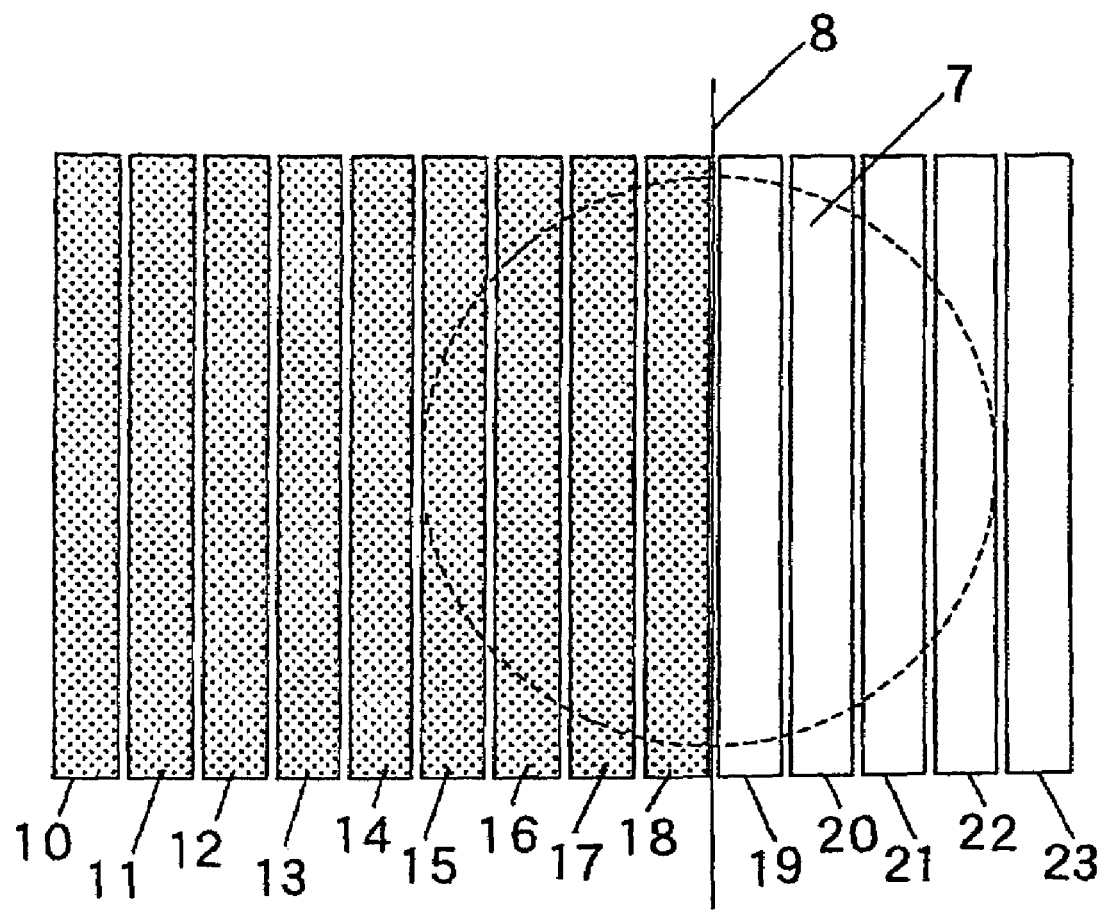
FIG. 7 is a front view of the light receiving portions at the micro lens unit.

FIG. 7 is a front view of the light receiving portions at the micro lens unit 6, taken when the area 7 is projected at a position different from that shown in FIG. 5. The area 7 ranges from the light receiving portion 15 through the light receiving portion 22 and the central line 8 dividing the area 7 into two portions containing equal numbers of light receiving portions extends between the light receiving portion 18 and the light receiving portion 19. The plurality of light receiving portions 10-23 are divided into groups (10-18) and (19-23) each contained in one of a pair of zones on the left side and on the right side of the central line 8. One of the image signals in the pair of image signals is formed by using the outputs from the light receiving portions in one zone (containing the light receiving portions 10-18), and the other image signals in the pair of image signals is formed by using the outputs from the light receiving portions in the other zone (containing the light receiving portions 19-23). Thus, a pair of images formed with the pair of focus detection light fluxes with light quantities substantially equal to each other can be output.

Figure 8:
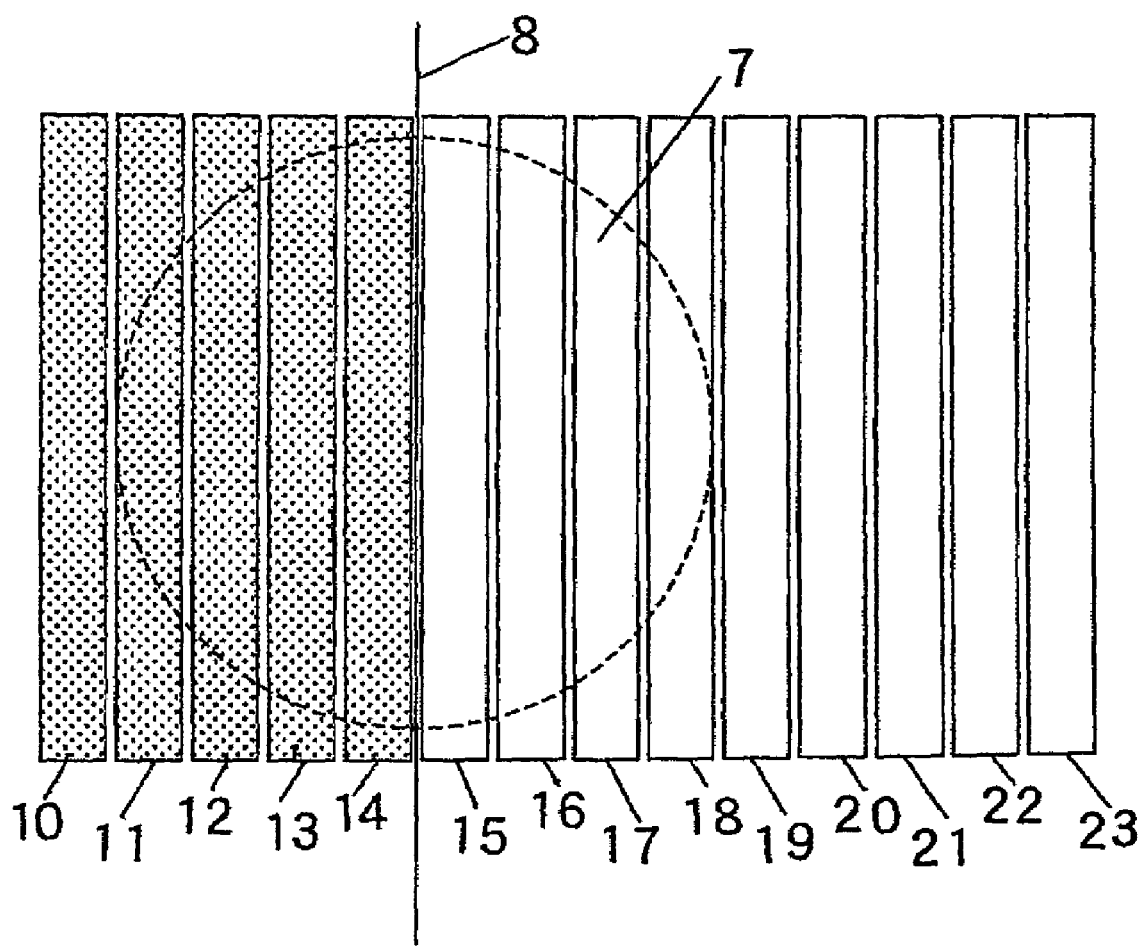
FIG. 8 is a front view of the light receiving portions at the micro lens unit.

FIG. 8 is a front view of the light receiving portions at the micro lens unit 6 when the area 7 is projected at a position different from those shown in FIGS. 5 and 7. The area 7 ranges from the light receiving portion 11 through the light receiving portion 18 and the central line 8 dividing the area 7 into two portions containing equal numbers of light receiving portions extends between the light receiving portion 14 and the light receiving portion 15. The plurality of light receiving portions 10-23 are divided into groups (10-14) and (15-23) each contained in one of a pair of zones on the left side and on the right side of the central line 8. One of the image signals in the pair of image signals is formed by using the outputs from the light receiving portions in one zone (containing the light receiving portions 10-14), and the other image signals in the pair of image signals is formed by using the outputs from the light receiving portions in the other zone (containing the light receiving portions 15-23). Thus, a pair of images formed with the pair of focus detection light fluxes with light quantities substantially equal to each other can be output.

Figure 9:
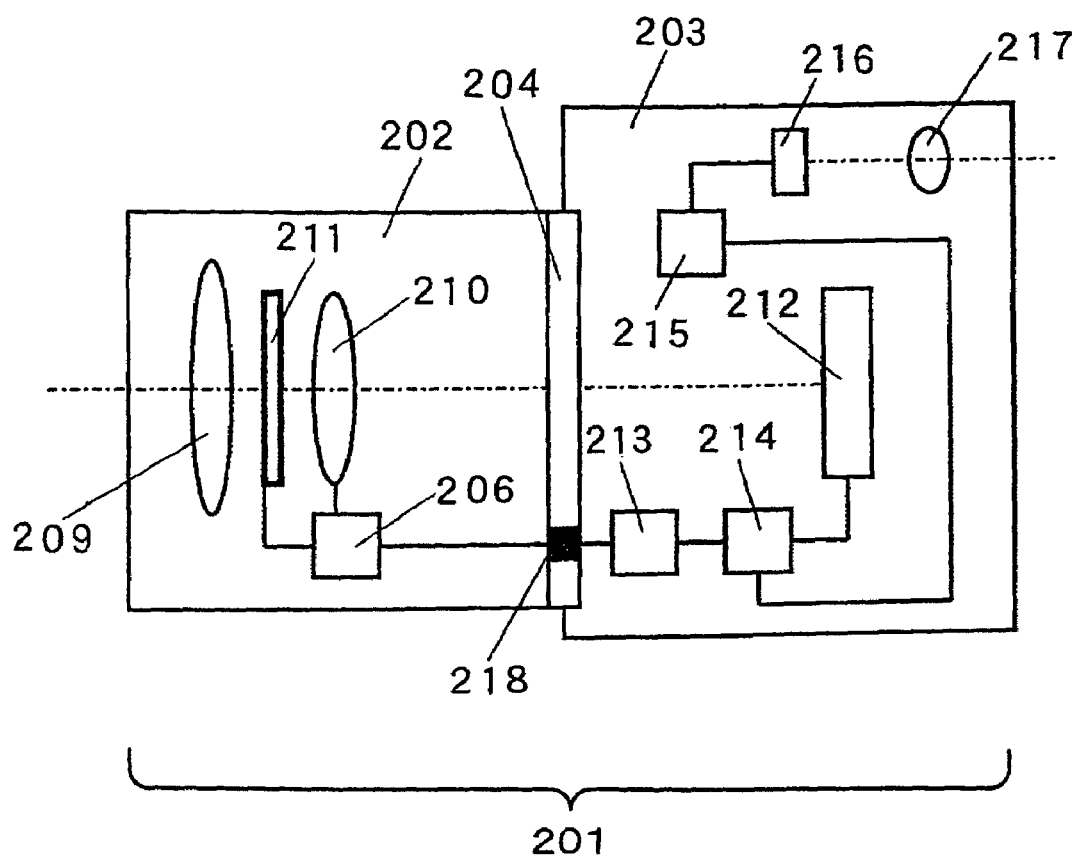
FIG. 9 shows the structure adopted in an optical system that includes the focus detection device achieved in the embodiment.

FIG. 9 shows the structure adopted in an optical system equipped with the focus detection device achieved in the embodiment. The optical system shown in this example is a digital still camera. A digital still camera 201 includes a camera body 203 and an exchangeable lens unit 202, which are coupled with each other via a mount unit 204. The exchangeable lens unit 202 comprises a lens 209 via which a subject image is formed, a focusing lens 210, an aperture 211, a lens CPU 206 that executes drive control for the focusing lens 210 and drive control for the aperture 211 and the like. It is to be noted that an image forming optical system is constituted with the lens 209, the focusing lens 210, the aperture 211 and the like.

At the camera body 203, an image-capturing element 212 disposed at the estimated image forming plane where an image is expected to be formed via the exchangeable lens unit 202, a body CPU 214 that reads out image signals from the image-capturing element 212 and controls the overall operations in the digital still camera 201, a focus detection unit (focus detection circuit) 213 that detects the state of focal adjustment achieved via the exchangeable lens 202 based upon some of the image signals received thereat from the body CPU 214, a liquid crystal display element 216 at a liquid crystal viewfinder (EVF: electric viewfinder), an eye-piece lens 217 through which the liquid crystal display element 216 is observed, a liquid crystal display element drive circuit 215 that drives the liquid crystal display element 216 at the liquid crystal viewfinder under control executed by the body CPU 214 and the like are mounted.

The focus detection unit 213 and the lens CPU 206 transmit various types of information (aperture information, information indicating the defocus quantity based upon which the lens is driven and the like) via an electrical contact point portion 218 located at the mount unit 204. Micro lens units 6 adopting the structure described above are disposed at a plurality of positions each corresponding to one of a plurality of focus detection positions.

A subject image having passed through the exchangeable lens unit 202 and formed on the image-capturing element 212 undergoes photoelectric conversion at the image-capturing element 212. An output from the image-capturing element 212 is transmitted to the body CPU 214. The outputs from the micro lens units (focus detection pixels) 6 are provided to the focus detection unit 213. The focus detection unit 213 reads out the aperture information corresponding to the exchangeable lens unit 202 mounted at the camera body 203 by engaging in communication with the lens CPU 206 and calculates the position and shape of the area 7 as described above based upon the aperture information and information indicating the plurality of focus detection positions, which is held at the focus detection unit 213. The focus detection unit 213 also determines the boundary line extending perpendicular to the direction along which the plurality of light receiving portions of each micro lens unit 6 are set side-by-side so as to divide the area 7 thus calculated into two substantially equal portions and divides the plurality of light receiving portions into two groups, one contained in the zone present on one side of the boundary line and the other contained in the zone present on the other side of the boundary line. The focus detection unit 213 forms one of the image signals in the pair of images with the outputs from the light receiving portions in one zone and forms the other image signal in the pair of image signals with the outputs from the light receiving portions in the other zone.

It is to be noted that the lens CPU 206 adjusts the aperture information in correspondence to the focusing state, the zooming state and the aperture setting conditions. More specifically, the lens CPU 206 monitors the positions of the lenses 209 and 210 and the aperture position at the aperture 211 to calculate the aperture information corresponding to the monitor information or to select the aperture information matching the monitor information from a lookup table prepared in advance.

The focus detection unit 213 executes focus detection calculation processing of the known art on the pair of image signals obtained at each focus detection position and calculates the image offset quantity indicating the extent of image offset manifesting between the pair of images at the particular focus detection position. The focus detection unit 213 then calculates the defocus quantity at each focus detection position by multiplying the corresponding image offset quantity by a conversion coefficient to be detailed later. The focus detection unit 213 next determines the ultimate defocus quantity based upon the plurality of defocus quantities. For instance, it may select as the ultimate defocus quantity the defocus quantity indicating the closest range among the plurality of defocus quantities, or it may select as the ultimate defocus quantity the average of the plurality of defocus quantities. If it is determined based upon the ultimate defocus quantity that it is necessary to drive the lens (if it is decided that a focus match has not been achieved), the focus detection unit 213 transmits the ultimate defocus quantity to the lens CPU 206.

Based upon the defocus quantity having been received, the lens CPU 206 calculates the lens drive quantity indicating the extent to which the lens should be driven and drives the focusing lens 210 to the focus match point based upon the lens drive quantity. The body CPU 214 generates image signals to be used for image display based upon the output signals provided by the image-capturing element 212 and displays an image at the liquid crystal display element 216 via the liquid crystal display element drive circuit 215 based upon the image signals thus generated.

Figure 10:
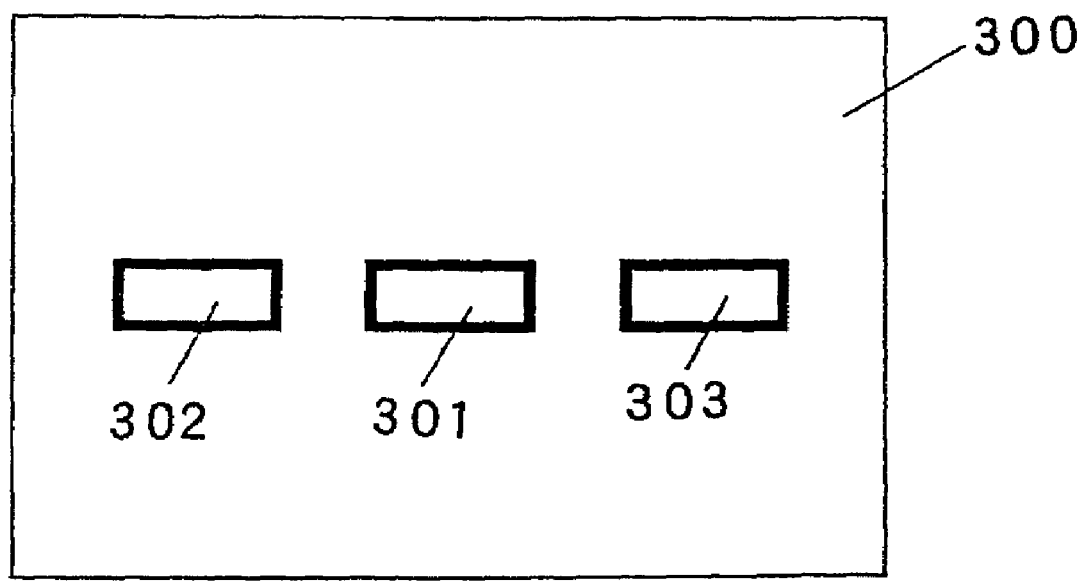
FIG. 10 presents a specific example of the focus detection device included in the digital still camera in FIG. 9.

FIG. 10 presents a specific example of focus detection positions assumed in the digital still camera 201 shown in FIG. 9. The plurality of focus detection positions having been explained in reference to FIG. 9 may include a focus detection position 301 at the center of a photographic image plane 300 and focus detection positions 302 and 303 on the left side and the right side at the image plane, as shown in FIG. 10.

Figure 11:
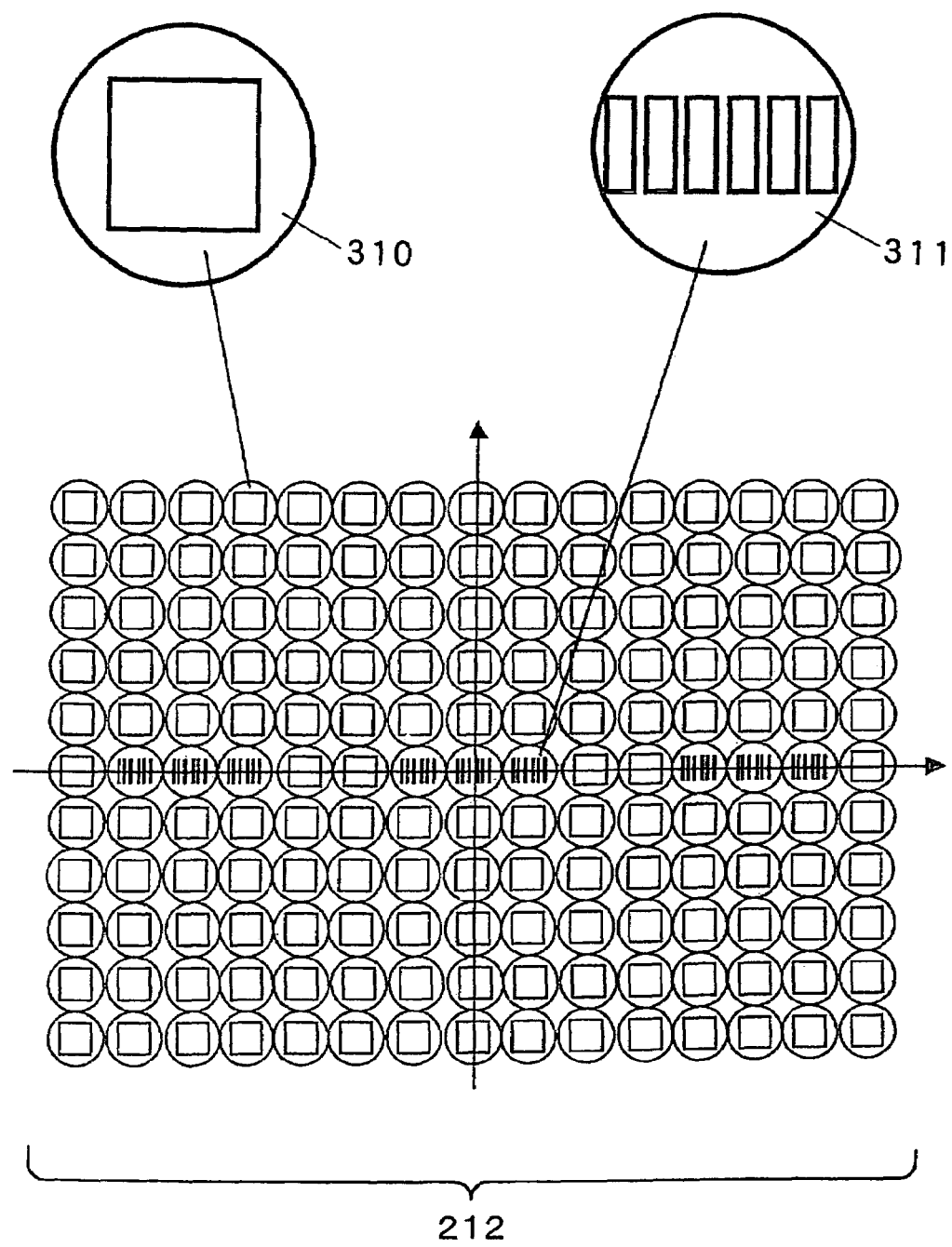
FIG. 11 shows in detail the structure adopted in the image-capturing element 212 in FIG. 9.

FIG. 11 shows in detail the structure of the image-capturing element 212 in FIG. 9. The image-capturing element 212 is achieved by two-dimensionally arraying imaging pixels 310 each constituted with a micro lens and a light receiving portion. Over the area corresponding to the three focus detection positions in FIG. 10, focus detection pixels 311 (which correspond to the micro lens units 6 explained earlier) are disposed as shown in the figure. The plurality of light receiving portions at the individual focus detection pixels 311 are set along a radial direction relative to the image plane center (optical axis center) and the focus detection pixels 311 themselves, too, are set along the radial direction relative to the image plane center (optical axis center). Namely, the plurality of light receiving portions at each focus detection pixel 311 are disposed side-by-side along the horizontal direction (to the left and to the right in FIG. 11) at the image-capturing element 212 and the plurality of focus detection pixels 311 are disposed in a single row along the horizontal direction at the image-capturing element 212.

Figure 12:
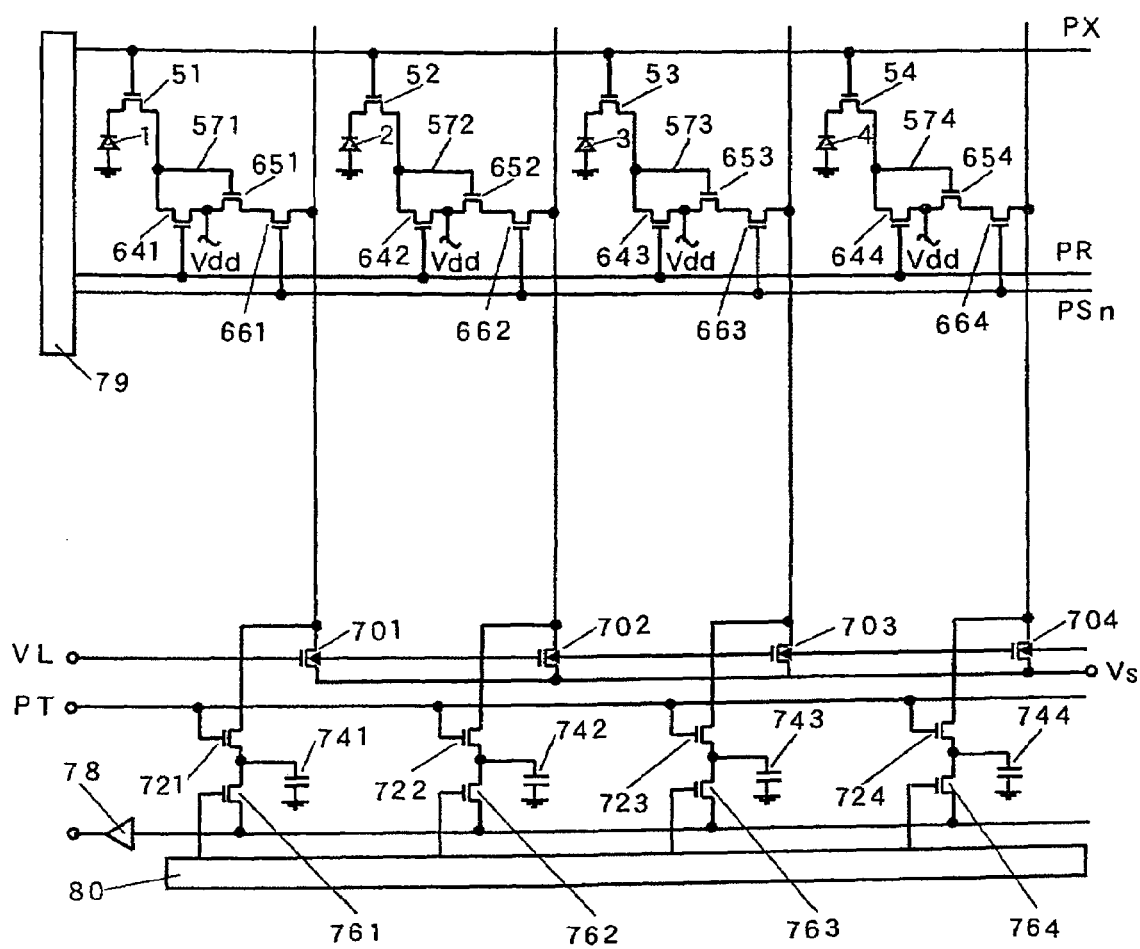
FIG. 12 shows the structure adopted in the focus detection pixel circuit.

FIG. 12 shows the circuit structure adopted at the focus detection pixels 311. It is to be noted that FIG. 12 only shows a single micro lens unit 6 with four light receiving portions. Reference numerals 1-4 each indicate a light receiving portion (photodiode), reference numerals 51-54 each indicates a transfer switch MOS transistor, and reference numerals 641-644 indicate reset MOS transistors that respectively reset the light receiving portions 1-4 to a predetermined potential level. In addition, reference numerals 651-654 indicate source follower amplifier. MOS transistors through which amplified signals are obtained based upon the electrical charges transferred from the light receiving portions 1-4 via the transfer switch MOS transistors 51-54 and reference numerals 571-574 indicate floating diffusion portions (FD portions) of the source follower amplifier MOS transistors 651-654 respectively.

Reference numerals 661-664 indicate horizontal selector switch MOS transistors each used to select the corresponding light receiving portion from which the amplified signal among the amplified signals obtained via the source follower amplifier MOS transistors 651-654 is to be read and reference numerals 701-704 indicate load MOS transistors that, together with the source follower amplifier MOS transistors 651-654 respectively, constitute source followers. Predetermined voltages VL and VSS are applied to the load MOS transistors 701-704. In addition, reference numerals 721-724 indicate output transfer MOS transistors that control the transfer of the outputs from the source follower amplifier MOS transistors 651-654 respectively, whereas reference numerals 741-744 indicate the output accumulating capacitors at which the outputs transferred via the output transfer MOS transistors 721-724 are accumulated.

Reference numerals 761-764 indicate horizontal transfer MOS transistors that transfer to a horizontal output line the individual outputs having been accumulated at the output accumulating capacitors 741-744, reference numeral 78 indicates an output amplifier that amplifies a signal and outputs the amplified signal, reference numeral 79 indicates a vertical scanning circuit that executes on/off control for the horizontal selector switch MOS transistors 661-664 and the like and reference numeral 80 indicates a horizontal scanning circuit that executes on/off control for the horizontal transfer MOS transistors 761-764.

Figure 13:
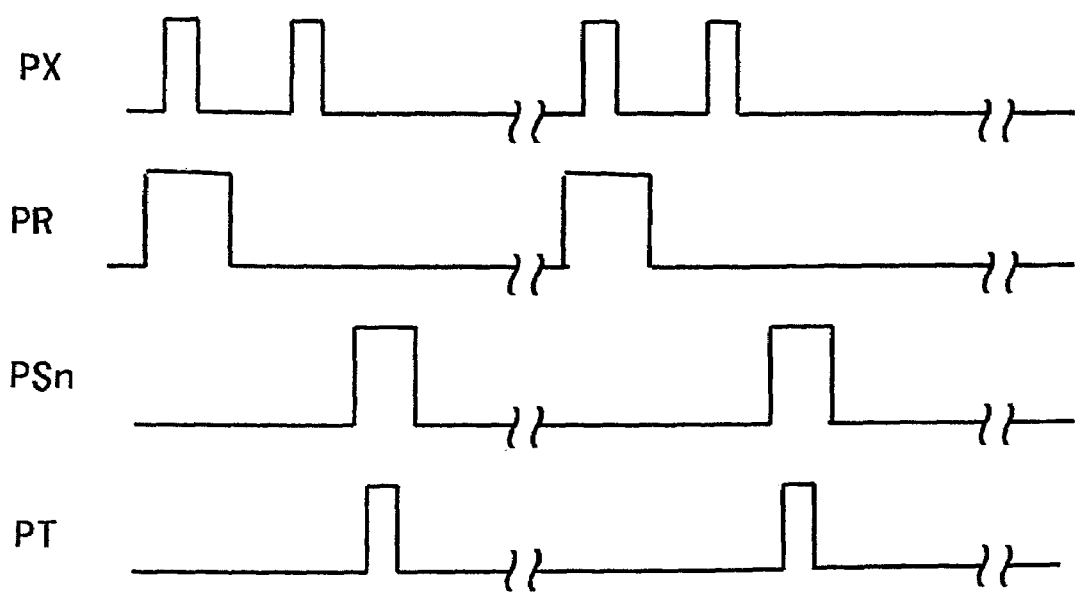
FIG. 13 is a timing chart of the operation executed in the image-capturing element circuit shown in FIG. 12.

FIG. 13 is a timing chart of the operation executed in the imaging element circuit in FIG. 12. A control pulse PR is first set to high level. Next, a control pulse PX is switched to high level, thereby simultaneously turning on the transfer switch MOS transistors 51-54. Since the control pulse PR is at high level at this time, the electrical charges remaining in the photodiodes 1-4 are reset to the level of the voltage Vdd, together with the residual charges at the FD portions 571-574. Next, the control pulse PX is set to low-level, thereby simultaneously starting electrical charge storage at the photodiodes 1-4. In addition, the control pulse PR is set to low level, thereby setting the FD portions 571-574 in a floating state.

After the electrical charge storage period elapses, the control pulse PX is set to high level, thereby setting the transfer switch MOS transistors 51-54 in a continuous state so as to transfer the electrical charges having been stored at the photodiodes 1-4 to the FD portions 571-574 respectively. As the electrical charges having become converted at the photodiodes 1-4 are transferred to the FD portions 571-574, the electrical potentials at the FD portions 571-574 change in correspondence to the quantities of light received at the photodiodes 1-4. Since the source follower amplifier MOS transistors 651-654 are in the floating state at this time, the control pulses PSn and PT are temporarily switched to high level to output the potentials at the FD portions 571-574 to the output accumulating capacitors 741-744 respectively. The electrical charges having become accumulated at the output accumulating capacitors 741-744 are output from the differential output amplifier 78 during the horizontal transfer period in response to scanning timing signal provided by the horizontal scanning circuit 80 to the horizontal transfer MOS transistors 761-764.

Through the operation described above, a pixel output over one line containing the focus detection pixels 311 at the image-capturing element 212 is obtained. By executing the operation described above with the control pulse PSn (n indicates the number of lines present along the vertical direction) sequentially shifted along the vertical direction, image signals corresponding to all the lines (output from the imaging pixels 310 and the focus detection pixels 311) can be obtained.

Figure 14:
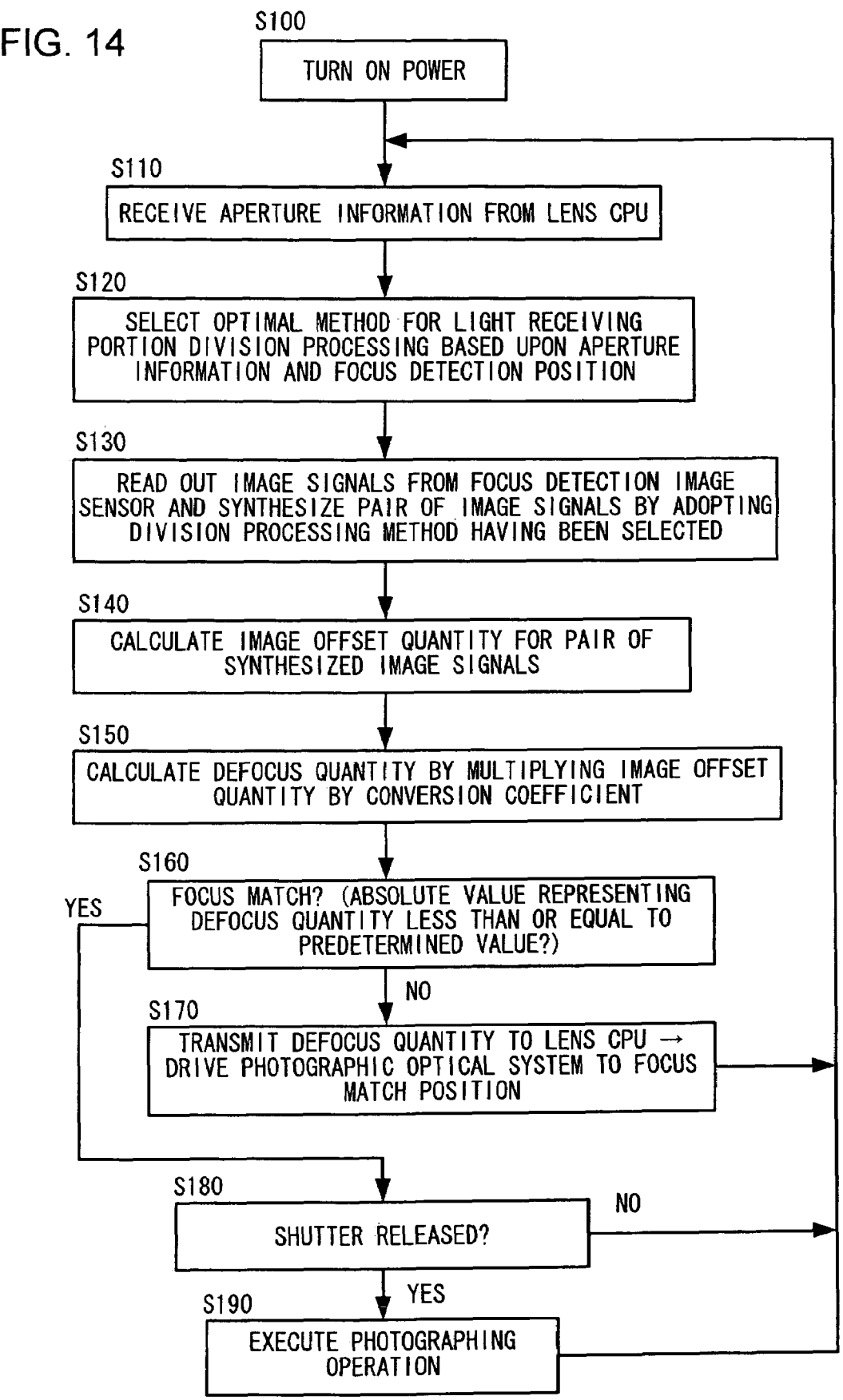
FIG. 14 presents a flowchart of the operations executed in the digital still camera (optical system) shown in FIG. 9, and more specifically the operations executed in the body CPU and the focus detection unit.

FIG. 14 presents a flowchart of the operations executed in the digital still camera (optical system) 201 shown in FIG. 9, and more specifically, the operations executed in the body CPU 214 and the focus detection unit 213. After the power is turned on in step 100, the operation proceeds to step 110 to receive the aperture information from the lens CPU 206. In the following step 120, the optimal light receiving portion division processing method is determined in correspondence to each focus detection position based upon the aperture information and the focus detection position information. In step 130, the image signals at the plurality of light receiving portions are read out from each of the focus detection pixels 311 at the image-capturing element 212 in correspondence to each focus detection position and the light receiving portions are divided into two groups through the dividing method having been determined in step 120. Then, by synthesizing (adding) the outputs of the light receiving portions in each light receiving portion groups resulting from the division, a pair of image signals are generated.

In step 140, the image offset quantity is calculated for the pair of image signals having been synthesized in correspondence to each focus detection position. Next, the image offset quantity at each focus detection position is multiplied by the conversion coefficient (to be detailed later) and thus, the defocus quantity at each focus detection position is calculated in step 150. Then, based upon the plurality of defocus quantities thus calculated, the ultimate defocus quantity is determined. In step 160, a decision is made as to whether or not a focus match has been achieved in the image forming optical system based upon the ultimate defocus quantity. If it is decided that a focus match has not been achieved, the operation proceeds to step 170 to transmit the defocus quantity to the lens CPU 206 and after driving the photographic optical system (image forming optical system), and more specifically the focusing lens 210, to the focus match position, the operation returns to step 110 to repeatedly execute the operation described above.

If, on the other hand, it is decided in step 160 that a focus match has been achieved, the operation proceeds to step 180 to make a decision as to whether or not a shutter release button (not shown) has been operated to release the shutter (to issue a photographing start instruction). If the shutter has not been released, the operation returns to step 110 to repeatedly execute the operation described above. If, on the other hand, the shutter has been released, the operation proceeds to step 190 to execute a photographing operation. Then, the operation returns to step 110 to repeatedly execute the operation described earlier.

Figure 15:
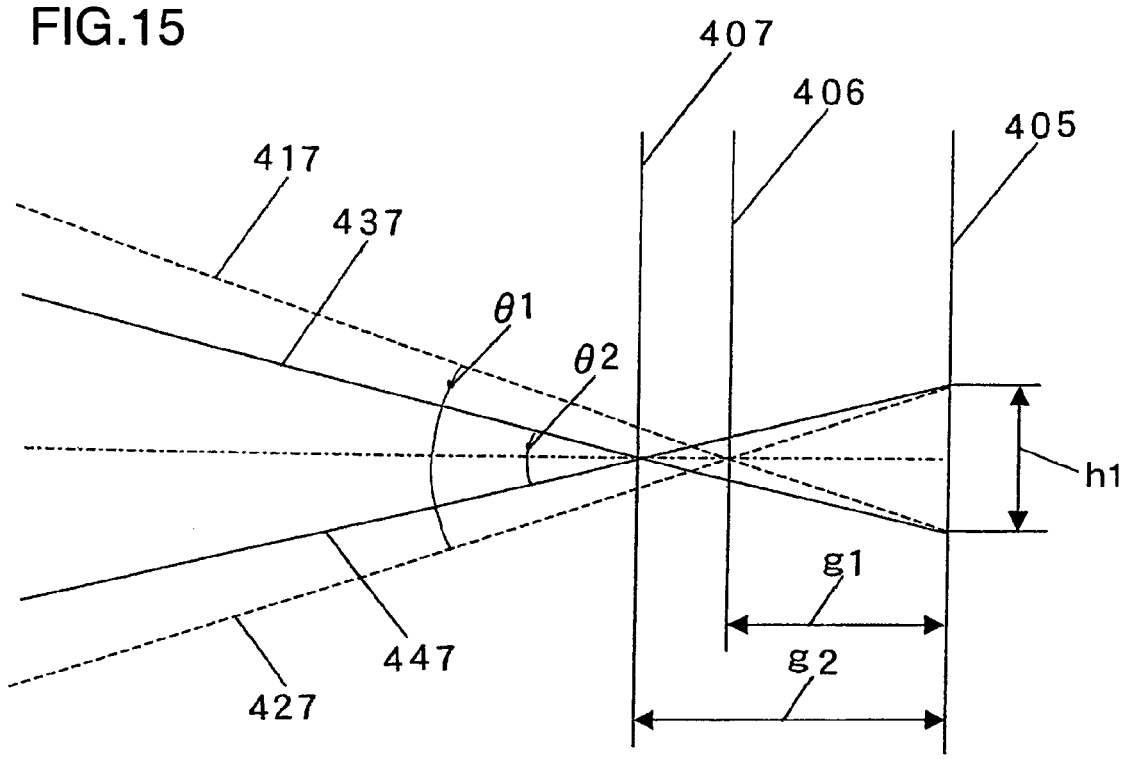
FIG. 15 is a figure to facilitate the explanation of the conversion coefficient.

FIG. 15 is provided to facilitate an explanation of the conversion coefficient by which the image offset quantity is multiplied. FIG. 15 shows images formed by focus detection light fluxes 417 and 427 on a plane 406 and images formed with focus detection light fluxes 437 and 447 at a plane 407, all relative to a focus detection plane 405. Distances g1 and g2 from the focus detection plane 405 to the planes 406 and 407 respectively represent defocus quantities.

The conversion coefficient used when converting the image offset quantity between the images in each pair to a defocus quantity is determined in correspondence to the opening angle formed by the gravitational centers of the focus detection light fluxes received at the light receiving portions divided into the specific two groups to synthesize the pair of images. Assuming that the opening angle formed by the gravitational centers of the focus detection light fluxes 417 and 427 is θ1 when the image offset quantity is h1, as illustrated in FIG. 15, the defocus quantity g1 can be calculated as expressed below with k1 representing the conversion coefficient.

$$g1 = k1 \times h1 \approx h1/2 \cdot \tan(\theta 1/2) \quad (1)$$

The defocus quantity g2 corresponding to the opening angle θ2 formed by the gravitational center of the focus detection light fluxes 437 and 447 is calculated as expressed below with k2 representing the conversion coefficient, in correspondence to the same image offset quantity h1.

$$g1 = k2 \times h1 \approx h1/2 \cdot \tan(\theta 2/2) \quad (2)$$

In other words, the conversion coefficient used when calculating the defocus quantity based upon the image offset quantity indicating the extent of offset manifesting between the images in a given pair is determined in correspondence to the opening angle at the gravitational centers of the focus detection light fluxes received at the light receiving portions used to synthesize the pair of images.

Figure 16:
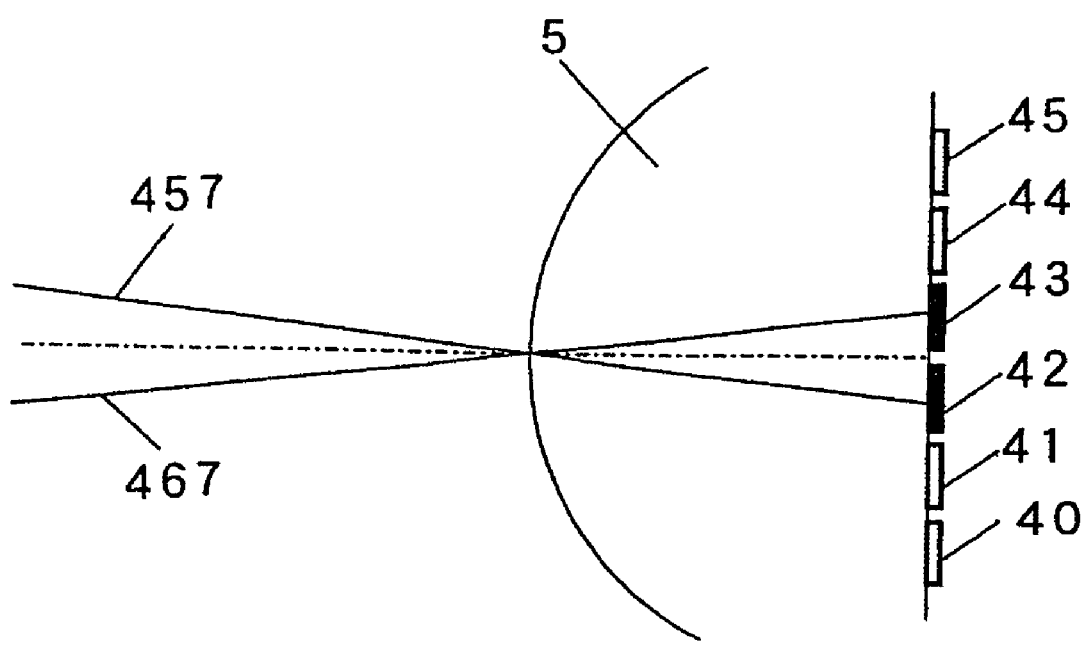
FIG. 16 shows the gravitational centers of focus detection light fluxes.
Figure 17:
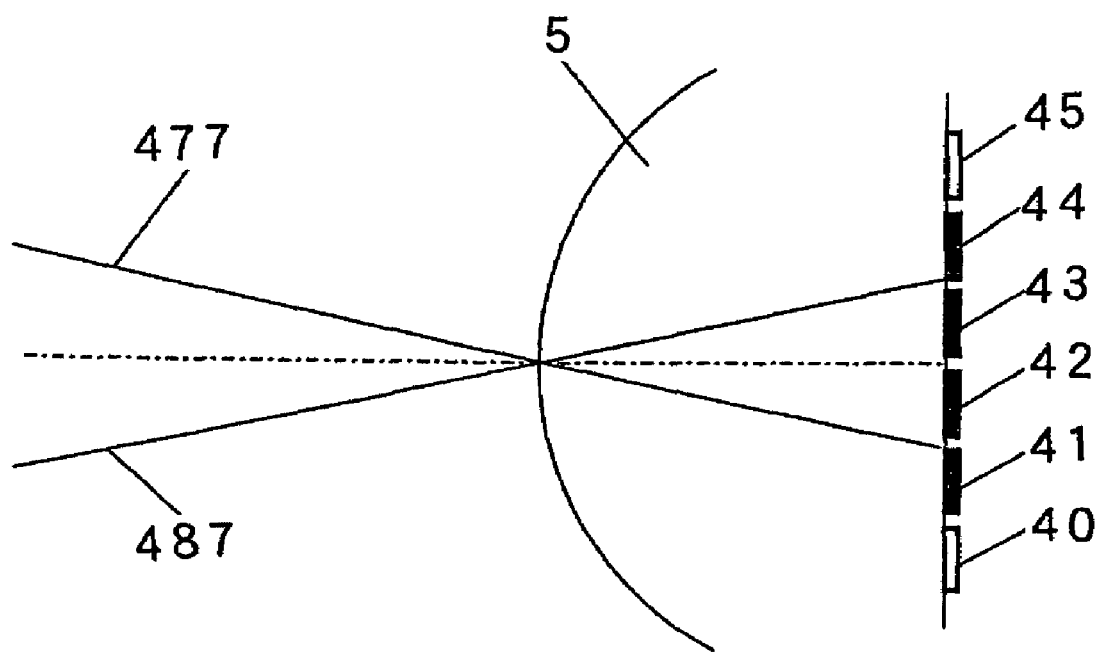
FIG. 17 shows the gravitational centers of focus detection light fluxes.
Figure 18:
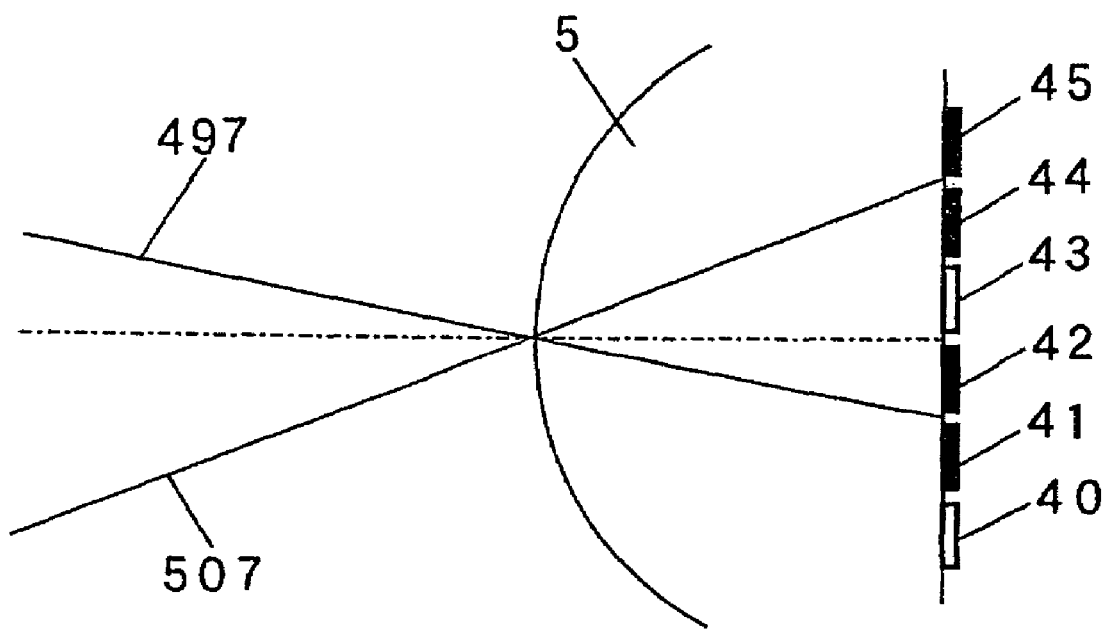
FIG. 18 shows the gravitational centers of focus detection light fluxes.

In reference to FIGS. 16-18, the gravitational centers of focus detection light fluxes are explained. An explanation is given here on an example in which six light receiving portions 40, 41, 42, 43, 44, and 45 are set side-by-side behind the micro lens 5. FIG. 16 shows the light receiving portions divided into two zones at the boundary line set between the light receiving portion 42 and the light receiving portion 43, with the pair of focus detection light fluxes received at the light receiving portion 42 belonging to one zone and the light receiving portion 43 belonging to the other zone. In this case, a gravitational center 457 of the focus detection light flux received at the light receiving portion 42 and a gravitational center 467 of the focus detection light flux received at the light receiving portion 43 are the gravitational centers of the focus detection light fluxes.

FIG. 17 shows the light receiving portions divided into two zones at the boundary line set between the light receiving portion 42 and the light receiving portion 43, with the pair of focus detection light fluxes received at the light receiving portions 41 and 42 belonging to one zone and the light receiving portions 43 and 44 belonging to the other zone. In this case, a gravitational center 477 of the focus detection light flux received at the light receiving portions 41 and 42 and a gravitational center 487 of the focus detection light flux received at the light receiving portions 43 and 44 are the gravitational centers of the focus detection light fluxes.

FIG. 18 shows the light receiving portions divided into two zones at the boundary line set between the light receiving portion 42 and the light receiving portion 44, with the pair of focus detection light fluxes received at the light receiving portions 41 and 42 belonging to one zone and the light receiving portions 44 and 45 belonging to the other zone. In this case, a gravitational center 497 of the focus detection light flux received at the light receiving portions 41 and 42 and a gravitational center 507 of the focus detection light flux received at the light receiving portions 44 and 45 are the gravitational centers of the focus detection light fluxes.

(Light Receiving Portion Selection)

Figure 19:
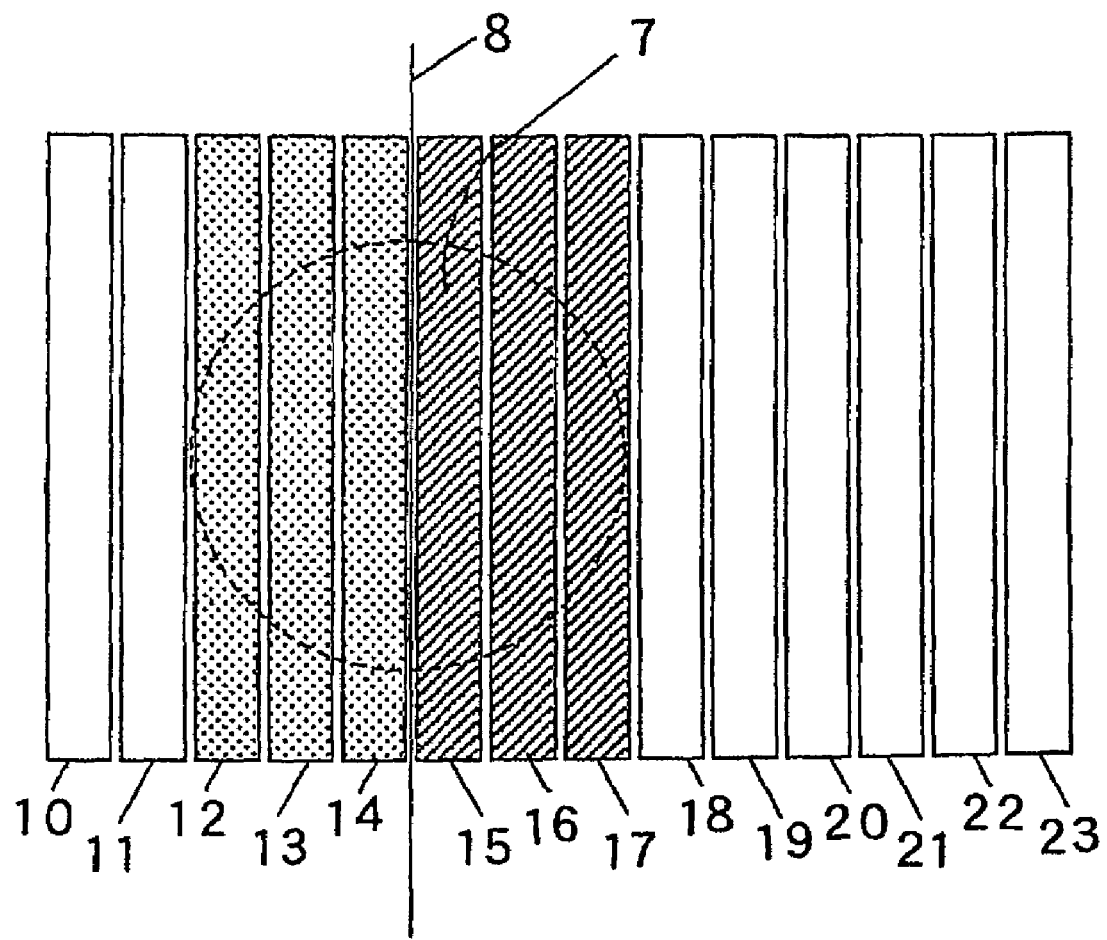
FIG. 19 shows how specific light receiving portions may be selected.

Specific light receiving portions may be selected by adopting a method other than that having been explained in reference to FIGS. 5-8. FIG. 19 shows light receiving portions 10-23 disposed side-by-side and light fluxes originating from a given image forming optical system projected onto an area 7 (the area inside the circle indicated by the dotted line) over the light receiving portions 10-23 via the micro lens 5. The area 7 ranges from the light receiving portion 12 through the light receiving portion 17 and the central line 8 dividing the area 7 into two portions containing equal numbers of light receiving portions extends between the light receiving portion 14 and the light receiving portion 15. The plurality of light receiving portions 10-23 are divided into groups (10-14) and (15-23) each contained in one of a pair of zones present on the left side and on the right side of the central line 8. One of the image signals in the pair of image signals is formed by using the outputs from the light receiving portions 12, 13 and 14 receiving the focus detection light flux among the light receiving portions 10-14 belonging in one zone, and the other image signal in the pair is formed by using the outputs from the light receiving portions 15, 16 and 17 receiving the other focus detection light flux among the light receiving portions 15-23 belonging in the other zone.

(Setting the Boundary Line)

Figure 20:
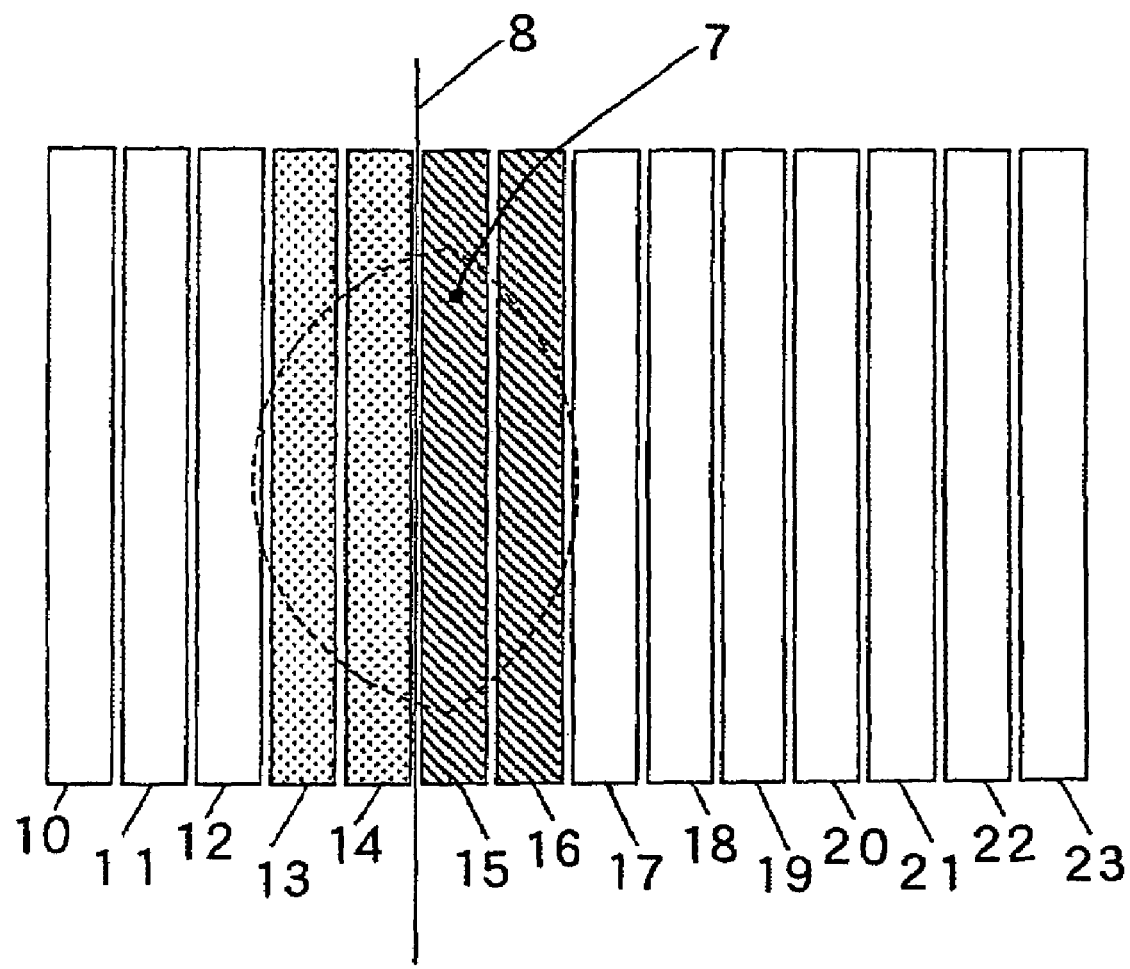
FIG. 20 shows how the boundary line may be set.

The boundary line may be set by adopting a method other than that having been explained in reference to FIGS. 5 through 8. FIG. 20 shows light receiving portions 10-23 disposed side-by-side and light fluxes originating from a given image forming optical system projected onto an area 7 (the area inside the circle indicated by the dotted line) over the light receiving portions 10-23 via the micro lens 5. Since a combined aperture eclipse attributable to a plurality of openings occurs, the area 7 assumes a rugby ball shape rather than a circular shape. The area 7 ranges from the light receiving portion 13 through the light receiving portion 16, and the boundary line 8 dividing the area 7 into two substantially equal portions containing equal numbers of light receiving portions set side-by-side extends between the light receiving portion 14 and the light receiving portion 15. The plurality of light receiving portions 10-23 23 are divided into groups (10-14) and (15-23) occupying a pair of zones on the left side and the right side of the boundary line 8.

One of the image signals in the pair of image signals is formed by using the outputs from the light receiving portions 13 and 14 receiving a focus detection light flux among the light receiving portions 10-14 belonging in one zone, and the other image signal in the pair is formed by using the outputs from the light receiving portions 15 and 16 receiving the other focus detection light flux among the light receiving portions 15-23 belonging in the other zone.

(Relationship Between Light Receiving Portion Size and Focus Detection Light Flux Size)

Figure 21:
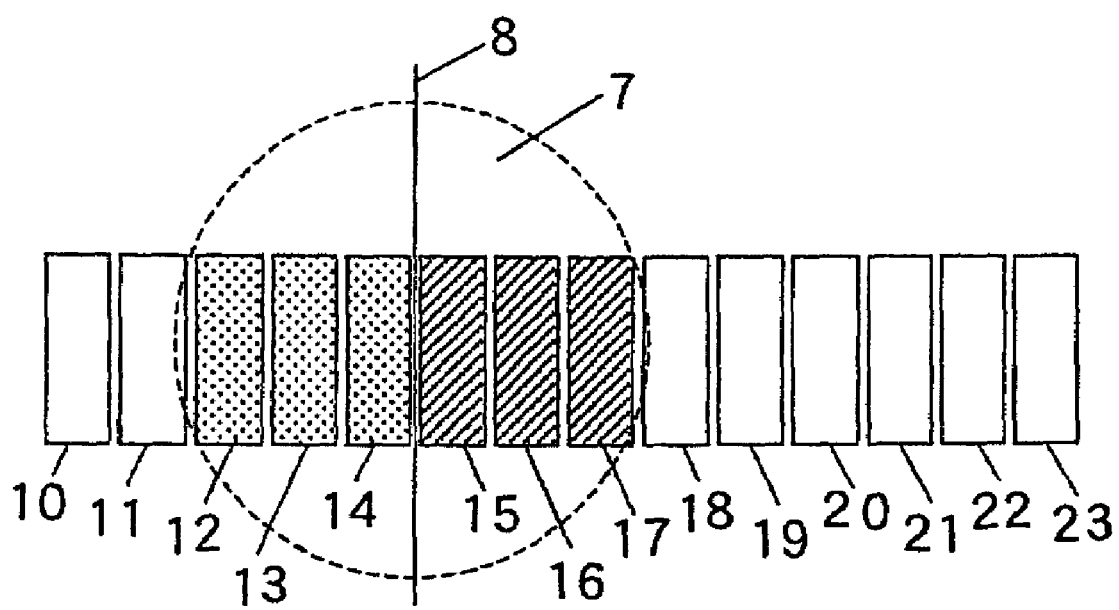
FIG. 21 shows the relationship between the light receiving portion size and the focus detection light flux size.

The relationship between the light receiving portion size and the focus detection light flux size is not limited to that explained in reference to FIGS. 5 through 8. FIG. 21 shows light receiving portions 10-23 disposed side-by-side and light fluxes originating from a given image forming optical system projected onto an area 7 (the area inside the circle indicated by the dotted line) over the light receiving portions 10-23 via the micro lens 5. The length of the light receiving portions 10-23 measured along the direction perpendicular to the direction in which the light receiving portions 10-23 are disposed side-by-side is set small enough to be contained in the area 7. The area 7 ranges from the light receiving portion 12 through the light receiving portion 17, and the boundary line 8 dividing the area 7 into two substantially equal portions containing equal numbers of light receiving portions set side-by-side extends between the light receiving portion 14 and the light receiving portion 15. The plurality of light receiving portions 10-23 are divided into a pair of groups (10-14) and (15-23) occupying the zones on the left side and the right side of the boundary line 8. One of the image signals in the pair of image signals is formed by using the outputs from the light receiving portions 12, 13 and 14 receiving a focus detection light flux among the light receiving portions belonging in one zone and the other image signal in the pair is formed by using the outputs from the light receiving portions 15, 16 and 17 receiving the other focus detection light flux among the light receiving portions 15-23 belonging in the other zone.

(Circuit Structure Adopted at Focus Detection Pixels)

Figure 22:
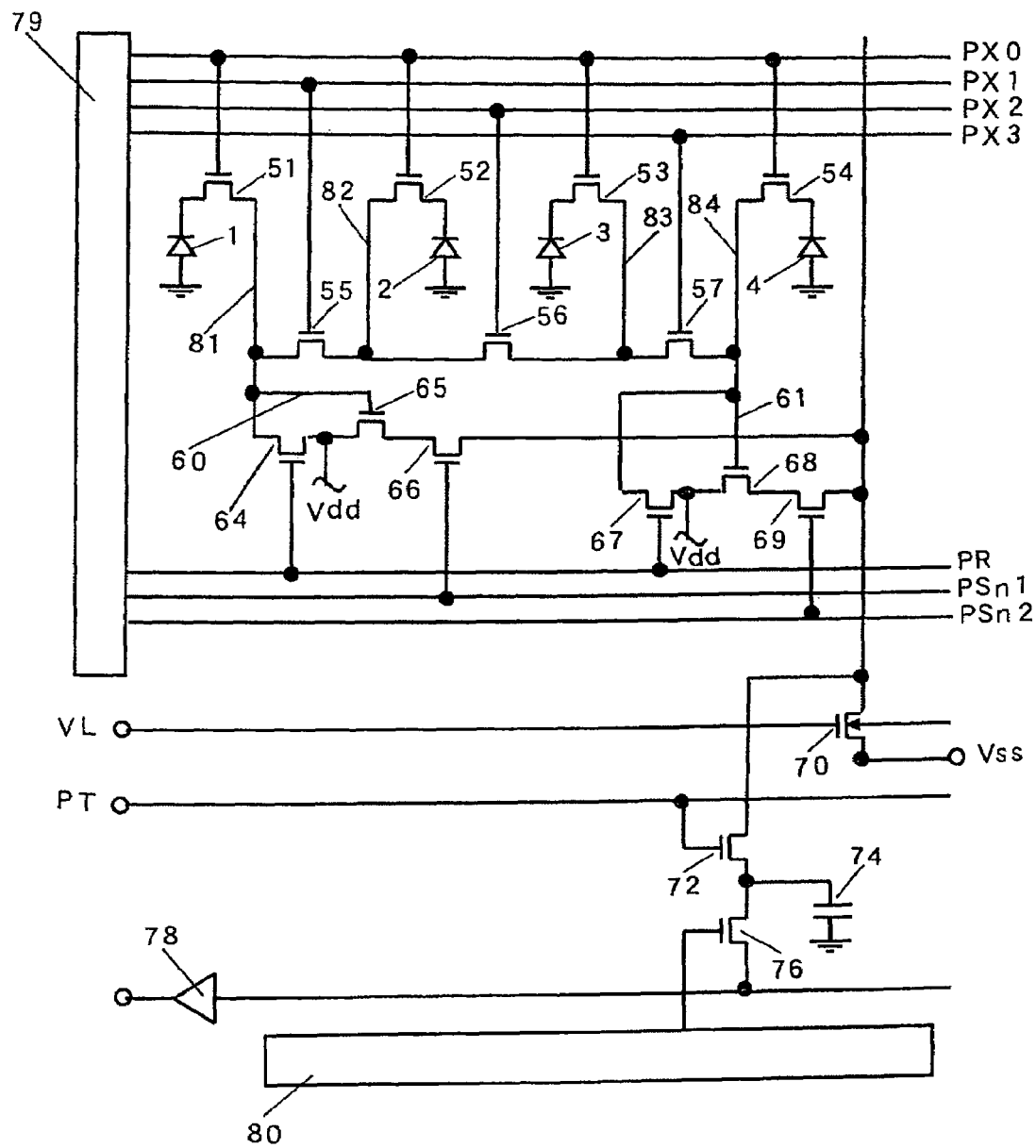
FIG. 22 shows a structure that may be adopted in the focus detection pixel circuit.

FIG. 22 shows a circuit structure that may be adopted in the focus detection pixels 311. The focus detection pixels 311 may adopt a structure other than that shown in FIG. 12. While the outputs from the individual light receiving portions are read out separately by the image sensor (image-capturing element) 212 and then a pair of image signals are synthesized (through addition) in the circuit structure shown in FIG. 12, the light receiving portion outputs are synthesized within the image sensor and thus a pair of image signals are directly output from the image sensor 212 in the circuit structure in FIG. 22.

Reference numerals 1-4 each indicate a light receiving portion (photodiode), reference numerals 51-54 each indicate a transfer switch MOS transistor, reference numerals 81-84 each indicate the drain regions of the respective transfer switch MOS transistors, reference numerals 55, 56 and 57 each indicate a selector switch MOS transistor with which the light receiving portions 1-4 are divided into two groups, and reference numerals 64 and 67 indicate reset MOS transistors with which the electrical potentials at the light receiving portions 1-4 are reset to a predetermined level. In addition, reference numerals 65 and 68 indicate source follower amplifier MOS transistors from which amplified signals are obtained based upon the electrical charges transferred from the light receiving portions 1-4 via the transfer switch MOS transistors 51-54 and reference numerals 60 and 61 indicate floating diffusion portions (FD portions) of the source follower amplifier MOS transistors 65 and 68 respectively.

Reference numerals 66 and 69 indicate horizontal selector switch MOS transistors each used to select the corresponding light receiving portion from which the amplified signal, among the amplified signals obtained via the source follower amplifier MOS transistors 65 and 68, is to be read, and reference numerals 70 indicates a load MOS transistor that, together with the source follower amplifier MOS transistors 65 and 68, constitutes source followers. Predetermined voltages VL and VSS are applied to the load MOS transistor 70. Reference numeral 72 indicates an output transfer MOS transistor that controls the transfer of the outputs from the source follower amplifier MOS transistors 65 and 68, whereas reference numeral 74 indicates an output accumulating capacitor at which the outputs transferred via the output transfer MOS transistors 72 are accumulated. Reference numeral 76 indicates a horizontal transfer MOS transistor that transfers to a horizontal output line the individual outputs having been accumulated at the output accumulating capacitors 74. Reference numeral 78 indicates an output amplifier that amplifies a signal and outputs the amplified signal, reference numeral 79 indicates a vertical scanning circuit that executes on/off control for the horizontal selector switch MOS transistors 66 and 69 and the like and reference numeral 80 indicates a horizontal scanning circuit that executes on/off control for the horizontal transfer MOS transistor 76.

Figure 23:
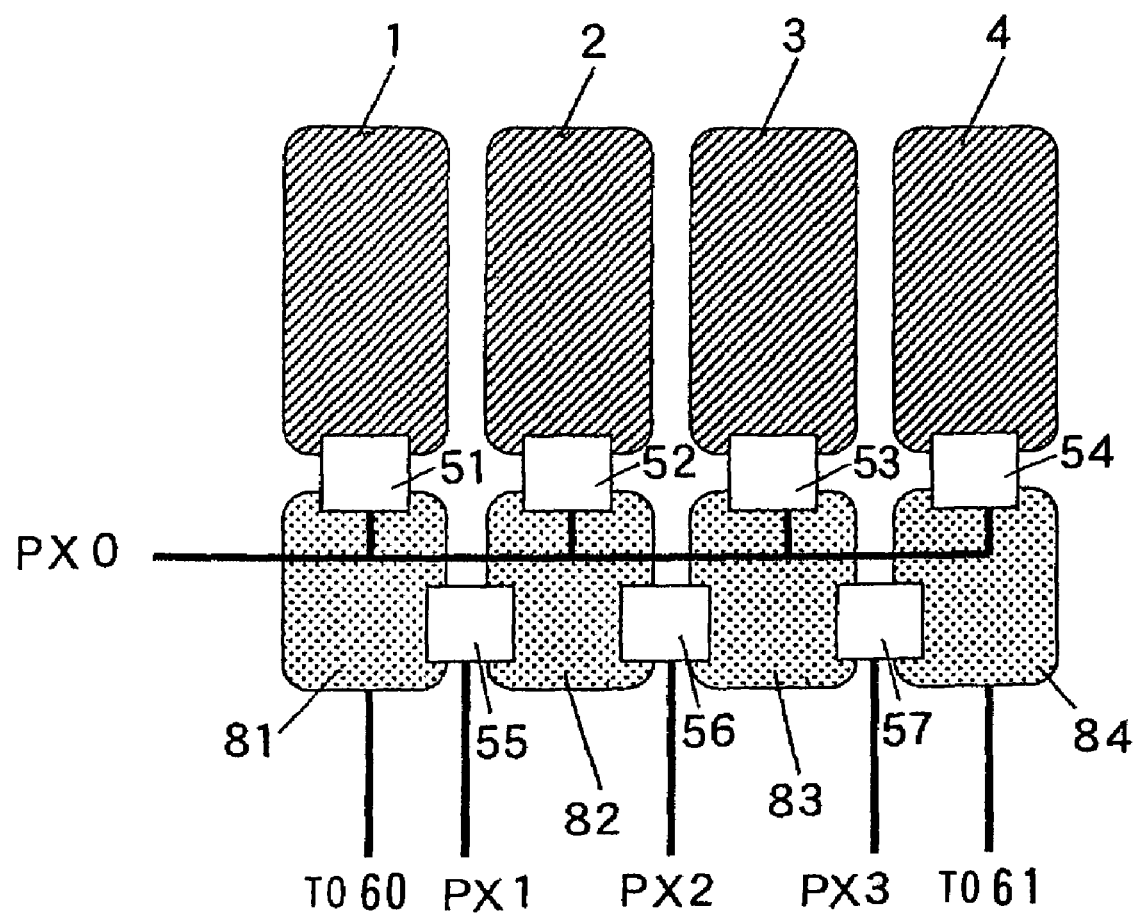
FIG. 23 shows the layout of the light receiving portions, the transfer switch MOS transistor, the drain regions of the transfer switch MOS transistors and the selector switch MOS transistors, viewed from the micro lens side.

FIG. 23 shows the layout of the light receiving portions 1-4, the transfer switch MOS transistors 51-54, the drain regions 81-84 of the transfer switch MOS transistors and the selector switch MOS transistors 55-57, viewed from the side where the micro lens 5 is present. The transfer switch MOS transistors 51-54 are respectively connected with the light receiving portions 1-4, and the gate at the transfer switch MOS transistors 51-54 are controlled via a common control pulse PX0. In addition, the selector switch MOS transistor 55 is connected between the drain regions 81 and 82 of the transfer switch MOS transistors 51 and 52. The selector switch MOS transistor 56 is connected between the drain regions 82 and 83 of the transfer switch MOS transistors 52 and 53.

The selector switch MOS transistor 57 is connected between the drain regions 83 and 84 of the transfer switch MOS transistors 53 and 54. The gates at the selector switch MOS transistors 55-57 are respectively controlled via control pulses PX1, PX2 and PX3. The drain regions 81 and 84 of the transfer switch MOS transistors 51 and 54 are connected to the floating diffusion portions 60 and 61 respectively.

In the focus detection pixel adopting the circuit structure described above, the outputs from the light receiving portions 1-4 are divided into two groups in any combination in order to synthesize signals to be provided to the FD portions 60 and 61, in correspondence to a specific on/off pattern set for the selector switch MOS transistors 55-57.

Figure 24:
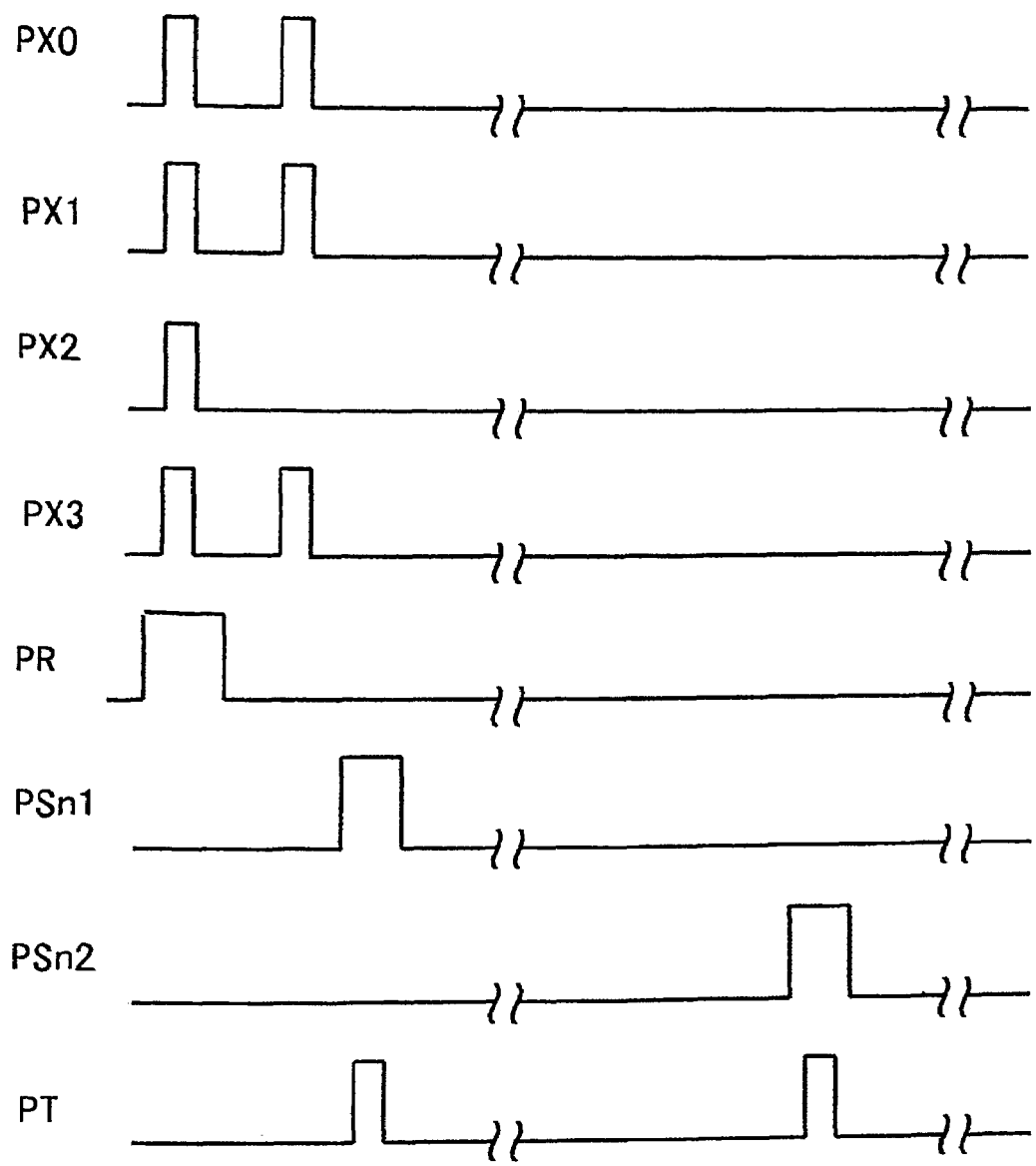
FIG. 24 is a timing chart of the operation executed in the image-capturing element circuit in FIG. 22 when outputting images by dividing the light receiving portions into two groups, one made up with the light receiving portions 1 and 2 and the other made up with the light receiving portions 3 and 4.

FIG. 24 is a timing chart of the operation executed in the imaging element circuit in FIG. 22 when the outputs from the light receiving portions are divided into two groups, one that includes the outputs from the light receiving portions 1 and 2 and the other that includes the outputs from the light receiving portions 3 and 4. A control pulse PR is first set to high level. Then, control pulses PX0-PX3 are switched to high level, thereby simultaneously turning on the transfer switch MOS transistors 51-54 and the selector switch MOS transistors 55-57. Since the control pulse PR is set to high at this time, the residual electrical charges remaining at the photodiodes 1-4, together with the residual electrical charges at the FD portions 60 and 61, are reset to a level matching that of the voltage Vdd. The control pulses PX0-PX3 are next set to low-level, thereby simultaneously starting electrical charge storage at the photodiodes 1-4 and the control pulse PR is set to low level to allow the FD portions 60 and 61 to enter a floating state.

After the electrical charge storage period elapses, the control pulse PX0 is switched to high level, thereby setting the transfer switch MOS transistors 51-54 in a continuous state. Also, the control pulses PX1 and PX3 are switched to high level to transfer to the FD portion 60 the sum of the electrical charges having been stored at the photodiodes 1 and 2 and transfer to the FD portion 61 the sum of the electrical charges having been stored at the photodiodes 3 and 4. At this time, the source follower amplifier MOS transistor 65 is in a floating state and control pulses PSn1 and PT are temporarily switched to high level to output the potential at the FD portion 65 to the output accumulating capacitor 74.

The electrical charge accumulated at the output accumulating capacitor 74 is output from the differential output amplifier 78 during a horizontal transfer period in response to a scanning timing signal provided by the horizontal scanning circuit 80 to the horizontal transfer MOS transistor 76. In addition, after the electrical charge having been accumulated at the output accumulating capacitor 74 is horizontally transferred via the horizontal scanning circuit 80, control pulses PSn2 and PT are temporarily switched to high level to output the electrical potential at the FD portion 68 to the output accumulating capacitor 74. The electrical charge accumulated at the output accumulating capacitor 74 is output from the differential output amplifier 78 during a horizontal transfer period in response to a scanning timing signal provided by the horizontal scanning circuit 80 to the horizontal transfer MOS transistor 76.

Through the operation described above, a pixel output over one line containing the focus detection pixels 311 at the image-capturing element 212 is obtained. By executing the operation described above with the control pulse PSn (n indicates the number of lines present along the vertical direction) sequentially shifted along the vertical direction, image signals corresponding to all the lines (output from the imaging pixels 310 and the focus detection pixels 311) can be obtained. Through the operation described above, synthesized signals, one obtained by adding together the outputs from the light receiving portions 1 and 2 and the other synthesized by adding together the outputs from the light receiving portions 3 and 4, are output.

Figure 25:
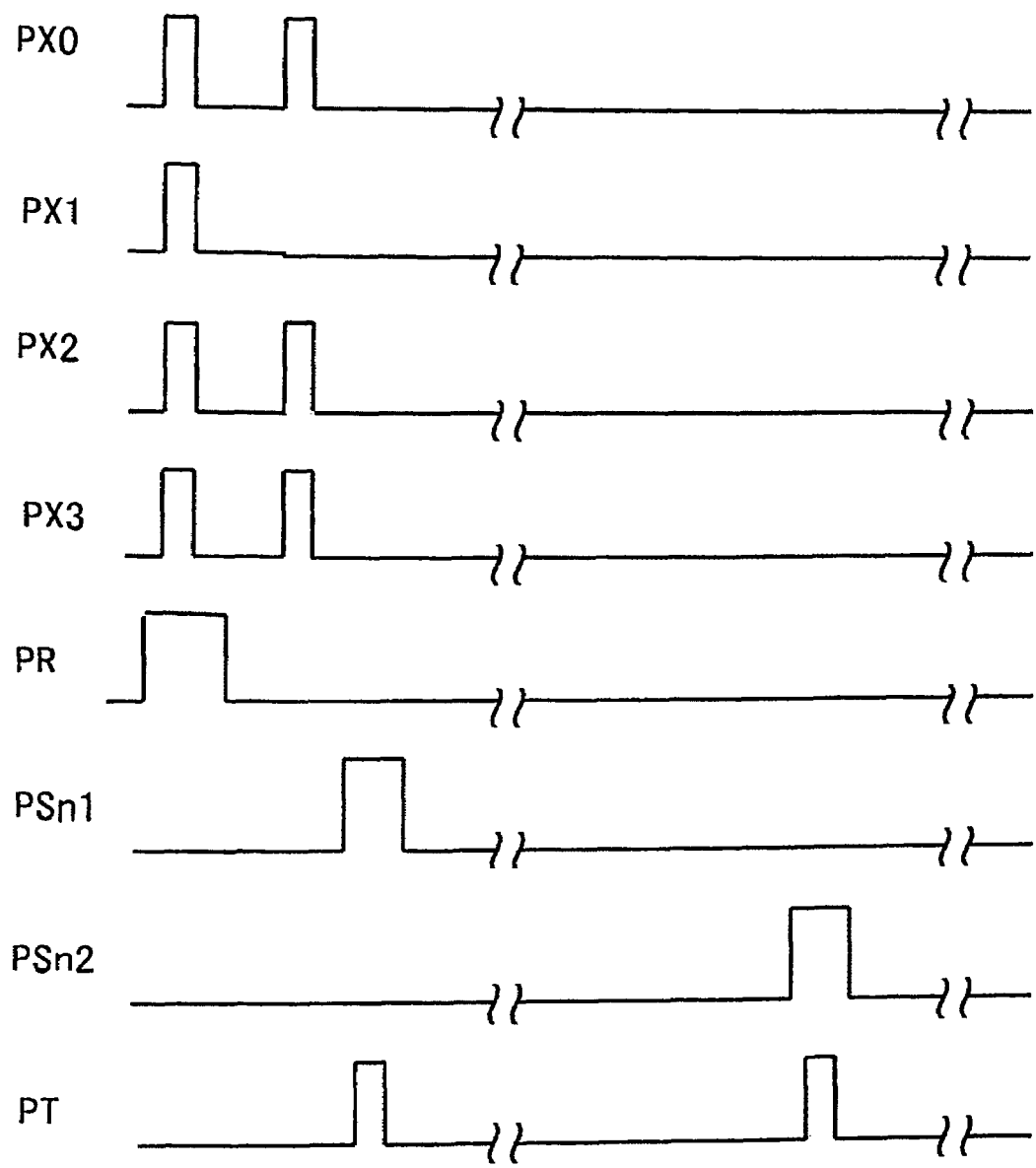
FIG. 25 is a timing chart of the operation executed in the image-capturing element circuit in FIG. 22 when outputting images by dividing the light receiving portions into two groups, one made up with the light receiving portion 1 and the other made up with the light receiving portions 2, 3 and 4.

FIG. 25 shows a timing chart of the operation executed in the image-capturing element circuit in FIG. 22 when the outputs from the light receiving portions are divided into two groups, one that includes the output from the light receiving portion 1 and the other that includes the outputs from the light receiving portions 2, 3 and 4. At the end of the electrical charge storage, the control pulse PX0 is switched to high level, thereby setting the transfer switch MOS transistors 51-54 in a continuous state, and the control pulses PX2 and PX3 are switched to high level to transfer the electrical charge having been stored at the photodiode 1 to the FD portion 60 and transfer to the FD portion 61 the sum of the electrical charges having been accumulated at the photodiodes 2, 3 and 4.

It is to be noted that an explanation is given above in reference to the embodiment on an example in which the optical system is constituted as the digital still camera 201. However, the optical system according to the present invention is not limited to the digital still camera 201 and the present invention may also be adopted in a compact camera module or the like built into, for instance, a portable telephone. In addition, the optical system according to the present invention may be adopted in a projector or the like equipped with a focus detection device.

As described above, in the focus detection device achieved in the embodiment, which includes a pixel row formed by arraying a plurality of pixels each having light receiving portions disposed behind a micro lens 5 and detects the state of focal adjustment at the image forming optical system based upon output signals from the light receiving portions, with the pixel row set near the estimated image forming plane of the image forming optical system, the light receiving portions are divided into at least three light receiving zones along the direction in which the pixel row ranges. As a result, the light receiving portions can be divided into groups so as to substantially equalize the output levels of a pair of image signals, which in turn enables highly accurate detection of image offset. Thus, the focus detection accuracy is improved.

In addition, the extent of offset manifesting in the pair of images formed with a pair of light fluxes passing through different pupil areas at the image forming optical system is determined based upon the output signals from a pair of light receiving zones selected based upon the aperture information for the image optical system and the state of the focal adjustment achieved with the image forming optical system is detected based upon the image offset quantity thus determined in the embodiment. As a result, the output levels of the pair of image signals are substantially equalized to enable highly accurate image offset detection and improve the focus detection accuracy.

In the embodiment, the light receiving portions are divided into two groups so as to substantially equalize the quantities of light received at the pair of light receiving zones containing one of the light receiving portion groups. As a result, the output levels of the pair of image signals are substantially equalized to enable highly accurate image offset detection and improve the focus detection accuracy.

In the embodiment, the conversion coefficient used to convert the image offset quantity to the defocus quantity indicating the extent of defocusing at the optical system is adjusted in correspondence to the specific light receiving portions selected to form the two groups. Thus, even when different light receiving portions are selected for image offset detection in correspondence to the contents of the aperture information, the defocus quantity can be calculated with accuracy.

The optical system in the embodiment, comprising a focus detection device and an optical system, further includes an image-capturing element which is formed by two-dimensionally arraying pixels each having a light receiving portion disposed behind a micro lens, captures a subject image formed via the optical system. The pixel row of the focus detection device is formed as part of the pixel array at the image-capturing element in this embodiment. Thus, the focus detection can be executed by using the image-capturing element that captures the subject image without having to include a dedicated image sensor exclusively used for the focus detection, which makes it possible to provide the optical system as a compact unit at lower cost.

The optical system in the embodiment comprises a main body (camera body 203) which includes the focus detection device and a lens body (exchangeable lens unit 202) that includes an optical system detachably mounted at the main body, with the lens CPU 206 at which the aperture information is stored mounted on the lens body side and the focus detection unit 213 disposed at the main body. The aperture information is read by the focus detection unit 213 from the lens CPU 206 at the lens body mounted at the main body. As a result, even when an image is captured by switching to a specific lens body among a plurality of different lens bodies in correspondence to a specific image capturing condition, the output level of the pair of image signals are always substantially equal, enabling highly accurate image offset detection which, in turn, improves the focus detection accuracy.

The above described embodiment is an example and various modifications can be made without departing from the scope of the invention.

What is claimed is:

1. A focus detection device, comprising:
    a micro lens array disposed near an estimated focal plane of an image forming optical system and formed by arraying a plurality of micro lenses;
    a light receiving device provided in correspondence to each of the plurality of micro lenses, which includes three or more light receiving portions disposed along a direction in which the plurality of micro lenses are arrayed; and a focus detection circuit that detects a focus adjustment state with the image forming optical system based upon a signal outputted from the light receiving device, wherein the focus detection circuit (i) calculates a single main area of a region which is formed by three or more light receiving portions onto which light flux originating from the image forming optical system is projected, (ii) determines a boundary line which divides the single main area into two sub areas, at least one of the sub areas including two or more light receiving portions adjacent to another light receiving portion of the same group, and (iii) splits all of the light receiving portions between a first group and a second group based on the boundary line, the first group being formed at one side of the boundary line, the second group being formed at another side of the boundary line.

2. The focus detection device according to claim 1, wherein:
the sub areas assume shapes identical to one another.

3. The focus detection device according to claim 1, wherein:
the focus detection circuit determines at least one of a position and a shape of the single main area based upon aperture information for the image forming optical system.

4. The focus detection device according to claim 1, wherein:
the focus detection circuit calculates an image offset quantity, indicating an extent of offset manifesting in a pair of images formed with a pair of light fluxes passing through different pupil areas at the image forming optical system based upon the output signals from the first and second groups and detects the focus adjustment state of the image forming optical system based upon the image offset quantity having been calculated.

5. The focus detection device according to claim 1, wherein:
the boundary line is determined so as to substantially equalize quantities of light received at the light receiving portions in one sub area to those at the light receiving portions in another sub area.

6. The focus detection device according to claim 4, wherein:
the focus detection circuit determines a conversion coefficient to be used to convert the image offset quantity to a defocus quantity indicating an extent of defocusing at the image forming optical system in correspondence to the first and second groups.

7. The focus detection device according to claim 6, wherein:
the focus detection circuit determines the conversion coefficient in correspondence to an opening angle formed by gravitational centers of the pair of light fluxes received at the first and second groups.

8. An optical system, comprising:
an image forming optical system;
a micro lens array disposed near an estimated focal plane of the image forming optical system and formed by arraying a plurality of micro lenses;
a light receiving device provided in correspondence to each of the plurality of micro lenses, which includes three or more light receiving portions disposed along a direction in which the plurality of micro lenses are arrayed; and
a focus detection circuit that detects a focus adjustment state with the image forming optical system based upon a signal outputted from the light receiving device, wherein the focus detection circuit (i) calculates a single main area of a region which is formed by three or more light receiving portions onto which light flux originating from the image forming optical system is projected, (ii) determines a boundary line which divides the single main area into two sub areas, at least one of the sub areas including two or more light receiving portions adjacent to another light receiving portion of the same group, and (iii) splits all of the light receiving portions between a first group and a second group based on the boundary line, the first group being formed at one side of the boundary line, the second group being formed at another side of the boundary line.

9. The optical system according to claim 8, further comprising:
an image pickup device that includes two-dimensionally arrayed pixels each constituted with a second micro lens and a second light receiving portion and takes an image formed via the image forming optical system, wherein:
the micro lens array and the light receiving device is constituted with some of the pixels at the image pickup device.

10. The optical system according to claim 8, further comprising:
a storage device at which aperture information for the image forming optical system is stored, wherein:
the focus detection circuit determines at least one of a position and a shape of the single main area in correspondence to the aperture information.

11. The optical system according to claim 9 wherein:
the focus detection circuit calculates an image offset quantity indicating an extent of offset manifesting in a pair of images formed with a pair of light fluxes passing through different pupil areas at the image forming optical system, based upon the output signals from the first and second groups and detects the focus adjustment state of the image forming optical system based upon the image offset quantity having been calculated.

12. The optical system according to claim 9 wherein:
the focus detection circuit determines the boundary line so as to substantially equalize quantities of light received at the light receiving portions in one sub area to those at the light receiving portions in another sub area.

13. The optical system according to claim 11, wherein:
the focus detection circuit determines a conversion coefficient to be used to convert the image offset quantity to a defocus quantity indicating an extent of defocusing at the image forming optical system in correspondence to the first and second groups.

14. The optical system according to claim 13, wherein:
the focus detection circuit determines the conversion coefficient in correspondence to an opening angle formed by gravitational centers of the pair of light fluxes received at the first and second groups.

15. The optical system according to claim 8, further comprising:
an image pickup device that includes pixels each constituted with one of the plurality of micro lenses and the light receiving device and takes a subject image formed via the image forming optical system.

16. A focus detection method, comprising:
forming a pixel row by arraying a plurality of pixels each including a light receiving device, the light receiving device including three or more light receiving portions disposed in correspondence to a micro lens and disposing the pixel row near an estimated image forming plane of an optical system;

calculating a single main area of a region which is formed by three or more light receiving portions onto which light flux originating from the image forming optical system is projected;

determining a boundary line which divides the single main area into two sub areas, at least one of the sub areas including two or more light receiving portions adjacent to another light receiving portion of the same group;

splitting all of the light receiving portions between a first group and a second group based on the boundary line, the first group being formed at one side of the boundary line, the second group being formed at another side of the boundary line;

calculating an image offset quantity indicating an extent of offset manifesting in a pair of images formed with a pair of light fluxes passing through different pupil areas at the optical system based upon output signals from the first and second groups; and detecting a focus adjustment state at the optical system based upon the image offset quantity having been calculated.

17. The focus detection method according to claim 16, wherein:
the boundary line are determined so as to substantially equalize quantities of light received at the light receiving portions in one sub area to those at the light receiving portions in another sub area.

18. The focus detection method according to claim 16, wherein:
the image offset quantity is converted to a defocus quantity indicating an extent of defocusing at the optical system by using a conversion coefficient when detecting the focus adjustment state at the optical system; and the conversion coefficient is determined in correspondence to the first and second groups.

19. An image device, comprising:
an image pickup device that includes two-dimensionally arrayed imaging pixels each including a first micro lens and a first light receiving device, and focusing pixels each including a second micro lens and a second light receiving device that includes three of more light receiving portions disposed along a direction in which the second micro lenses are arrayed; and a focus detection circuit that detects a focus adjustment state with the image forming optical system based upon a signal outputted from the light receiving device, wherein the focus detection circuit (i) calculates a single main area of a region which is formed by three or more light receiving portions onto which light flux originating from the image forming optical system is projected, (ii) determines a boundary line which divides the single main area into two sub areas, at least one of the sub areas including two or more light receiving portions adjacent to another light receiving portion of the same group, and (iii) splits all of the light receiving portions between a first group and a second group based on the boundary line, the first group being formed at one side of the boundary line, the second group being formed at another side of the boundary line.

20. The focus detection device according to claim 1, wherein the focus detection circuit determines the boundary line based upon aperture information for the optical system.

* * * * *